United States Patent
Ogino et al.

(10) Patent No.: US 9,649,960 B2
(45) Date of Patent: May 16, 2017

(54) IN-VEHICLE HEATING DEVICE

(71) Applicant: Panasonic Intellectual Property Management Co., Ltd., Osaka-shi, Osaka (JP)

(72) Inventors: Hiroyuki Ogino, Nara (JP); Takashi Sugio, Shiga (JP); Masaki Hanada, Shiga (JP); Takaaki Hyoudou, Kyoto (JP); Koji Yoshimoto, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/650,800

(22) PCT Filed: Nov. 29, 2013

(86) PCT No.: PCT/JP2013/007029
§ 371 (c)(1),
(2) Date: Jun. 9, 2015

(87) PCT Pub. No.: WO2014/091705
PCT Pub. Date: Jun. 19, 2014

(65) Prior Publication Data
US 2015/0329028 A1    Nov. 19, 2015

(30) Foreign Application Priority Data

Dec. 14, 2012  (JP) .................................. 2012-273800
Dec. 14, 2012  (JP) .................................. 2012-273801
(Continued)

(51) Int. Cl.
*B60N 2/56*  (2006.01)
*B60N 2/60*  (2006.01)
(Continued)

(52) U.S. Cl.
CPC .......... *B60N 2/5657* (2013.01); *B60N 2/5635* (2013.01); *B60N 2/5685* (2013.01); *B60N 2/6009* (2013.01)

(58) Field of Classification Search
None
See application file for complete search history.

(56) References Cited

U.S. PATENT DOCUMENTS 6,491,578 B2 * 12/2002 Yoshinori .......... B60H 1/00007
                                                    165/203
2006/0151455 A1 *  7/2006 Stowe .................. B60N 2/5635
                                                    219/202

(Continued)

FOREIGN PATENT DOCUMENTS

CN         102310793       1/2012
CN         202319988 U     7/2012

(Continued)

OTHER PUBLICATIONS

International Search Report, Mar. 4, 2014; PCT/JP2013/007029.
Office Action issued in corresponding Chinese Patent Application, May 4, 2016, 10 pages with English translation.

*Primary Examiner* — David E Allred
(74) *Attorney, Agent, or Firm* — Hamre, Schumann, Mueller & Larson, P.C.

(57) ABSTRACT

An in-vehicle heating device according to the present invention is provided on a lower part of a front side of a seat cushion (31) serving as a seating unit of a vehicle seat (30). The in-vehicle heating device includes: an air feeder (11) including a suction opening (11a) through which external air is sucked into the air feeder (11); a warm air generator (12) including a heater (22) therein, the warm air generator (12) being configured to heat air fed from the air feeder (11) to generate warm air; and a blow-out unit configured to blow out the warm air from the warm air generator (12), such that (Continued)

the warm air is blown out forward of the seat cushion (31). At least a part of the blow-out unit is positioned at a front of the seat cushion (31), and doubles as a front shield, which serves as a decorative member.

16 Claims, 17 Drawing Sheets

(30) Foreign Application Priority Data

| Feb. 5, 2013 | (JP) | 2013-020152 |
|---|---|---|
| Feb. 28, 2013 | (JP) | 2013-038387 |
| Feb. 28, 2013 | (JP) | 2013-038388 |

(56) References Cited

U.S. PATENT DOCUMENTS

| 2007/0193279 A1 | 8/2007 | Yoneno et al. | |
|---|---|---|---|
| 2011/0031786 A1 | 2/2011 | Kurokawa et al. | |
| 2016/0096460 A1* | 4/2016 | Storgato | B60N 2/5657 297/180.13 |
| 2016/0250905 A1* | 9/2016 | Tanaka | B60H 1/00285 454/75 |
| 2016/0272038 A1* | 9/2016 | Tanaka | B60H 1/00285 |
| 2016/0325655 A1* | 11/2016 | Joshi | B60N 2/5692 |

FOREIGN PATENT DOCUMENTS

| JP | 2005-253490 | 9/2005 |
|---|---|---|
| JP | 2010-242601 | 10/2010 |
| JP | 2011-126329 | 6/2011 |
| JP | 2011-254882 | 12/2011 |
| JP | 2012-183154 | 9/2012 |
| KR | 10-2012-0083152 | 7/2012 |

\* cited by examiner

IN-VEHICLE HEATING DEVICE

TECHNICAL FIELD

The present invention relates to a heating device mounted in a vehicle such as an automobile, and particularly to an in-vehicle heating device installed on a lower part of a vehicle seat.

BACKGROUND ART

Conventionally, there is a known heating device mounted in a vehicle such as an automobile (i.e., an in-vehicle heating device), which is installed on a lower part of a vehicle seat and which warms up the feet of a user.

For example, Patent Literature 1 discloses a vehicle-use seat capable of cooling and heating, for example, the feet of a user seated on the seat by utilizing small energy. The vehicle-use seat includes: an air feeder provided on a seat cushion or a seat back; an air intake duct and an air discharge duct extending from the air feeder; and a heat supply unit. The air intake duct includes an intake opening, which is open at the front of the seat cushion. The air discharge duct includes a discharge opening, which is open at the front of the seat cushion. The heat supply unit supplies hot energy or cold energy to air that flows from the intake opening to the discharge opening.

CITATION LIST

Patent Literature

PTL 1: Japanese Laid-Open Patent Application Publication No. 2011-254882

SUMMARY OF INVENTION

Technical Problem

It is often the case that for the purpose of improving the external appearance of a vehicle-use seat, a decorative front shield is fitted to the front of the seat cushion. The vehicle-use seat disclosed in Patent Literature 1 also includes a front shield.

The vehicle-use seat disclosed in Patent Literature 1 is configured such that the openings are formed in the front shield, and the air intake duct and the air discharge duct both extending from the air feeder are connected to the openings of the front shield. Therefore, the manufacturing of the vehicle-use seat includes, for example, a process of forming the openings in the front shield and a process of connecting the ducts to the front shield. Thus, there is a first problem in that the manufacturing process may become complex and cumbersome. It should be noted that the front shield is used merely for decorative purposes regardless of whether an in-vehicle heating device is installed or not installed.

In the vehicle-use seat disclosed in Patent Literature 1, the intake opening and the discharge opening are arranged in substantially the same plane at the front of the seat cushion. Accordingly, there is a second problem in that, when cooling or heating the feet of a user seated on the seat, warm air or cool air may not be suitably sent to the feet of the user.

In the vehicle-use seat disclosed in Patent Literature 1, the discharge opening is provided in a substantially single plane at the front of the seat cushion, and an air blow-out direction from the discharge opening is such that all of the air that is blown out of the discharge opening is directed forward of the seat. Accordingly, the blow-out air stream is fed only forward of the seat. Therefore, there is a third problem in that warm air or cool air may not sufficiently spread over the entire foot space whose width dimension is greater than the width dimension of the seat.

In a case where the vehicle-use seat disclosed in Patent Literature 1 is not provided with the front shield, which is used for decorative purposes, there is a fourth problem in that some object may come into contact with the intake opening and the discharge opening, causing damage to these openings.

Further, in the vehicle-use seat disclosed in Patent Literature 1, the intake opening and the blow-out opening are formed in the front shield. Therefore, wide space is formed between the blow-out opening and the feet of the user. For this reason, in order to warm up the feet of the user, it is necessary to increase the output and/or the air volume. This results in an increase in the load on the vehicle's battery, which is another problem.

In order to avoid this problem, it is conceivable to configure a blow-out unit with a blow-out opening formed therein, such that the blow-out unit extends forward of the seat cushion. In this case, however, there is a fifth problem in that when the user is seated on the seat, the seat cushion becomes deformed due to the weight of the user, and thereby the blow-out unit is pushed, causing a risk of the blow-out unit being damaged.

An object of the present invention is to provide an in-vehicle heating device that makes it possible to solve at least one of the above first to fifth problems.

Solution to Problem

In order to solve the above-described problems, an in-vehicle heating device according to the present invention is provided on a lower part of a front side of a seat cushion serving as a seating unit of a vehicle seat, and includes: an air feeder including a suction opening through which external air is sucked into the air feeder; a warm air generator including a heater therein, the warm air generator being configured to heat air fed from the air feeder to generate warm air; and a blow-out unit configured to blow out the warm air from the warm air generator, such that the warm air is blown out forward of the seat cushion. At least a part of the blow-out unit is positioned at a front of the seat cushion, and doubles as a front shield, which serves as a decorative member.

According to the above configuration, since the blow-out unit doubles as the front shield, at the time of installing the in-vehicle heating device on the vehicle seat, processes such as a process of forming an opening in the front shield and a process of connecting a duct to the front shield are not necessary. This makes it possible to prevent the manufacturing process from becoming complex and cumbersome. Moreover, since the blow-out unit can be used as the front shield, an increase in the number of components can be suppressed.

Furthermore, since it is not necessary to use a suction duct or blow-out duct provided separately from the front shield, release of thermal energy from such a duct can be avoided. Accordingly, a possibility that thermal energy is released to areas other than the front of the seat cushion is reduced. This makes it possible to suppress the occurrence of heat loss and improve heating efficiency.

Advantageous Effects of Invention

Owing to the above-described configuration, the present invention has an advantage of being able to provide an in-vehicle heating device that makes it possible to prevent the manufacturing process from becoming complex and cumbersome and suppress an increase in the number of components.

DESCRIPTION OF EMBODIMENTS

Figure 1:
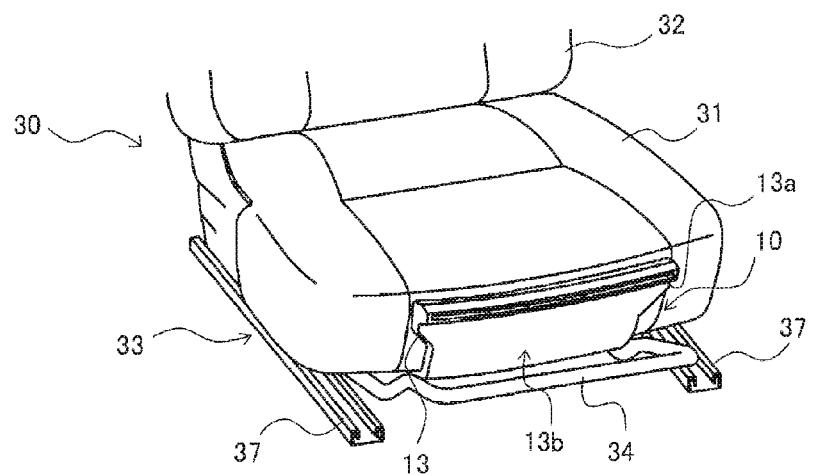
FIG. 1 is a perspective view schematically showing one example of a state where an in-vehicle heating device according to Embodiment 1 is installed on a vehicle seat.

Hereinafter, preferred embodiments of the present invention are described with reference to the drawings. In the drawings, the same or corresponding elements are denoted by the same reference signs, and repeating the same descriptions is avoided below. In the drawings, components necessary for describing the present invention are shown, but the other components are omitted in some cases.

Embodiment 1

An in-vehicle heating device according to Embodiment 1 is provided on a lower part of a front side of a seat cushion serving as a seating unit of a vehicle seat, and includes: an air feeder including a suction opening through which external air is sucked into the air feeder; a warm air generator including a heater therein, the warm air generator being configured to heat air fed from the air feeder to generate warm air; and a blow-out unit configured to blow out the warm air from the warm air generator, such that the warm air is blown out forward of the seat cushion. At least a part of the blow-out unit is positioned at a front of the seat cushion, and doubles as a front shield, which serves as a decorative member.

In the in-vehicle heating device according to Embodiment 1, the part of the blow-out unit, which is positioned at the front of the seat cushion, may be configured to emit radiation heat by being heated by the warm air.

In the in-vehicle heating device according to Embodiment 1, the air feeder and the warm air generator may be positioned at a reverse side of the seat cushion. An interior of the blow-out unit may serve as a warm air passage, through which the warm air from the warm air generator flows. A blow-out opening configured to blow out the warm air may be provided at a front end of the blow-out unit, and positioned at the front of the seat cushion. A front surface of the blow-out unit may double as the front shield.

In the in-vehicle heating device according to Embodiment 1, the blow-out opening may be provided facing diagonally downward at the front of the seat cushion.

The above configurations make it possible to prevent the manufacturing process from becoming complex and cumbersome and suppress an increase in the number of components compared to conventional in-vehicle heating devices.

Alternatively, the in-vehicle heating device according to Embodiment 1 is positioned at a front reverse side of a seat cushion serving as a seating unit of a vehicle seat, and includes: an air feeder including a suction opening through which external air is sucked into the air feeder, the suction opening being provided facing downward; a warm air generator positioned downstream of the air feeder and including a heater therein, the warm air generator being configured to heat an air flow from the air feeder to generate warm air; and a blow-out unit positioned forward of the warm air generator, the blow-out unit being configured to blow out the warm air from the warm air generator, such that the warm air is brown out forward of the seat cushion. The blow-out unit is configured to blow out the warm air forward from a position above the suction opening.

In the in-vehicle heating device according to Embodiment 1, the blow-out unit may have a flat shape that is wide in a width direction of the seat cushion. The blow-out unit may have a thickness less than that of the warm air generator, and an interior of the blow-out unit may serve as a warm air passage, through which the warm air from the warm air generator flows. A front end of the blow-out unit may be disposed at a position that is above the suction opening and that is at the front of the seat cushion, and a blow-out opening configured to blow out the warm air may be provided at the front end of the blow-out unit.

In the in-vehicle heating device according to Embodiment 1, the blow-out opening may be provided facing diagonally downward at the front of the seat cushion.

In the in-vehicle heating device according to Embodiment 1, the blow-out opening may be configured as a slit-shaped opening, which is wide in the width direction of the seat cushion.

In the in-vehicle heating device according to Embodiment 1, the heater is provided in the warm air generator such that the heater extends in a manner to cross an air-feeding direction from the air feeder, and in the warm air generator, a straightening member configured to direct a flow of the air from the air feeder toward the heater is provided at a position rearward of the heater.

According to the above configuration, the blow-out unit blows out the warm air forward of the seat cushion from a position above the suction opening in a manner to spread the warm air in the width direction. This makes it possible to suitably send the warm air over the entire feet of a user seated on the seat cushion.

Further alternatively, the in-vehicle heating device according to Embodiment 1 is positioned at a front reverse side of a seat cushion serving as a seating unit of a vehicle seat, and includes: an air feeder configured to suck in external air and feed the sucked air to a warm air generator; the warm air generator positioned downstream of the air feeder, the warm air generator being configured to heat an air flow from the air feeder to generate warm air; and a blow-out opening positioned downstream of the warm air generator, the blow-out opening being configured to blow out the warm air from the warm air generator, such that the warm air is blown out forward of the seat cushion. When the vehicle seat is seen from above, the blow-out opening is formed to be substantially arc-shaped such that its portions corresponding to both ends of the vehicle seat are positioned more rearward as becoming closer to both the ends of the vehicle seat.

In the in-vehicle heating device according to Embodiment 1, the blow-out opening may have a width greater than that of a heater provided in the warm air generator.

According to the above configuration, when seen from above the seat, the blow-out air advances forward in a manner to spread radially. This makes it possible to suitably send the warm air to the entire foot space, which is wider than the seat width.

[Configuration Example of In-Vehicle Heating Device]

Figure 2:
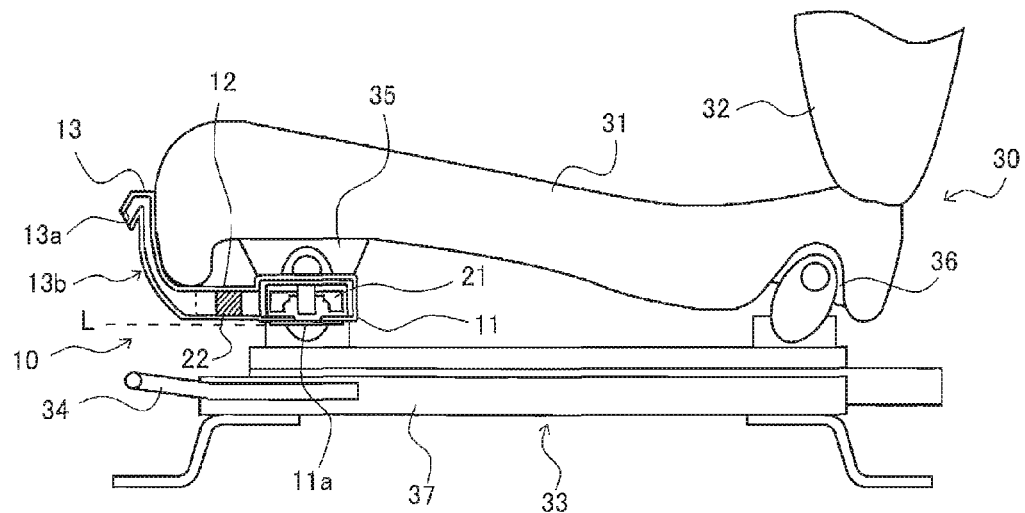
FIG. 2 is a schematic diagram showing a side view of the in-vehicle heating device of FIG. 1 and also showing one example of the internal configuration of the in-vehicle heating device.
Figure 3:
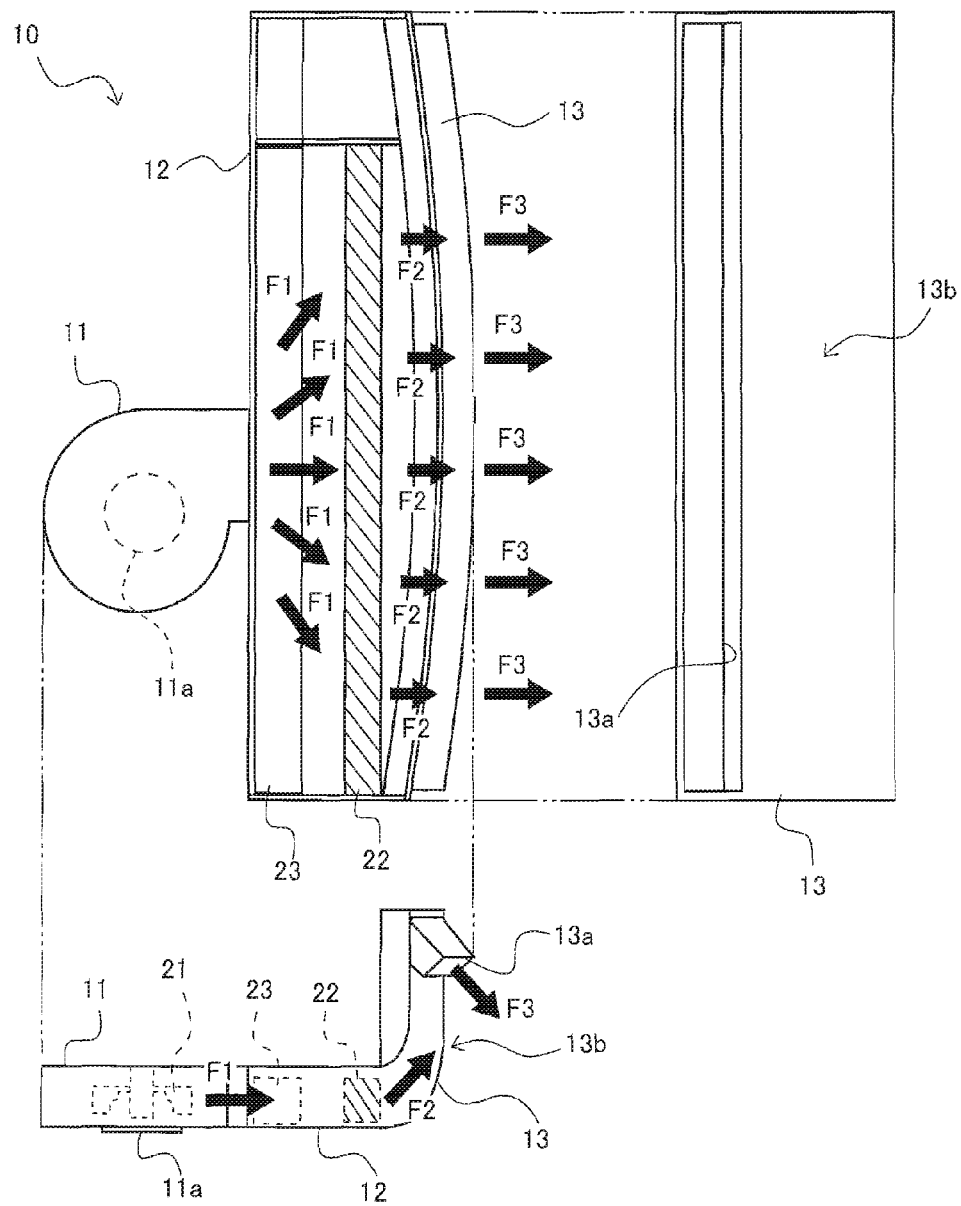
FIG. 3 illustrates a plan view, a side view, and a front view showing one example of the configuration of the in-vehicle heating device of FIG. 1.
Figure 4:
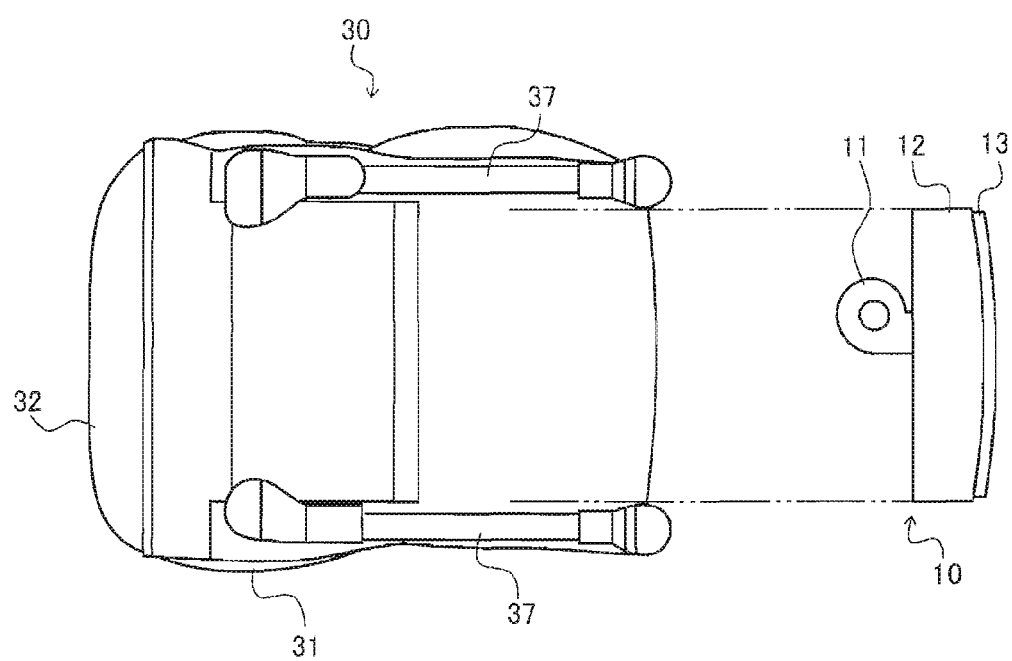
FIG. 4 is a schematic diagram showing, from below, one example of a state where the in-vehicle heating device shown in FIG. 1 is installed on the vehicle seat.

FIG. 1 is a perspective view schematically showing one example of a state where the in-vehicle heating device according to Embodiment 1 is installed on a vehicle seat. FIG. 2 is a schematic diagram showing a side view of the in-vehicle heating device of FIG. 1 and also showing one example of the internal configuration of the in-vehicle heating device. FIG. 3 illustrates a plan view, a side view, and a front view showing one example of the configuration of the in-vehicle heating device of FIG. 1. FIG. 4 is a schematic diagram showing, from below, one example of a state where the in-vehicle heating device shown in FIG. 1 is installed on the vehicle seat.

First, one example of the configuration of an in-vehicle heating device 10 according to Embodiment 1 is specifically described with reference to FIG. 1 to FIG. 4. As shown in FIG. 1 and FIG. 2, the in-vehicle heating device 10 according to the present embodiment is provided on the lower part of the front side of a seat cushion 31 of a vehicle seat 30.

First, the vehicle seat 30 is described. The vehicle seat 30 shown in FIG. 1 and FIG. 2 includes, for example, the seat cushion 31, a seat back 32, and a slide device 33. The seat cushion 31 serves as a seating unit, and the seat back 32 serves as a backrest unit. The seat back 32 is fitted to the seat cushion 31 via a reclining device, which is not shown. The inclination angle of the seat back 32 relative to the seat cushion 31 is changeable.

The slide device 33 includes an operating lever 34. Through an operation of the operating lever 34 by a user (a person seated on the seat), the position of the seat cushion 31 in the front-rear direction can be changed. The seat cushion 31 is fitted to the slide device 33 via known brackets 35 and 36. The in-vehicle heating device 10 according to the present embodiment is fitted to the front bracket 35, and is thereby provided on the lower part of the front side of the seat cushion 31.

As shown in FIG. 1 to FIG. 3, the in-vehicle heating device 10 includes, for example, an air feeder 11, a warm air generator 12, and a blow-out unit 13. The air feeder 11 is positioned at the front reverse side of the seat cushion 31. A fan motor 21 is provided inside the air feeder 11. The air feeder 11 is provided with a suction opening 11a (a bell mouth) for sucking in external air. The suction opening 11a is provided facing downward. The shape of the air feeder 11 in the present embodiment is substantially discoid in accordance with the shape of the fan motor 21, which is housed inside the air feeder 11. The air feeder 11 partly protrudes and connects to the warm air generator 12 so as to be in communication with the warm air generator 12. It should be noted that the specific configuration of the air feeder 11 is not particularly limited. As one configuration example, a known fan motor 21 may be provided in a known resin casing, and the suction opening 11a in a known shape may be formed in the casing.

In the present embodiment, the suction opening 11a may be formed in the bottom surface of the air feeder 11. However, the position of the suction opening 11a is not thus limited. As an alternative, the suction opening 11a may be formed, for example, in a side surface or front surface of the air feeder 11, so long as the suction opening 11a faces downward. For example, the suction opening 11a may be formed in a side surface or front surface (in the vicinity of the connection to the warm air generator 12) of the air feeder 11, such that the suction opening 11a faces downward. Forming the suction opening 11a such that the suction opening 11a faces downward makes it possible to assuredly prevent warm air from a blow-out opening 13a from being directly sucked into the suction opening 11a. It should be noted that the suction opening may face not only downward but also forward or laterally.

At the reverse side of the seat cushion 31, the warm air generator 12 is positioned downstream of the air feeder 11. The warm air generator 12 heats air fed from the air feeder 11 to generate warm air. Inside the warm air generator 12, a heater 22 and a current plate 23 are provided. The heater 22 is wide in the width direction of the seat cushion 31.

Accordingly, the warm air generator 12 has a flat shape that is wide in the width direction of the seat cushion 31.

As shown in FIG. 3, the heater 22 is substantially rod-shaped, and is provided in the warm air generator 12 such that the heater 22 extends in a manner to cross an air-feeding direction from the air feeder 11. In the warm air generator 12, the current plate 23 is provided at a position rearward of the heater 22 (i.e., a position upstream of the heater 22 with respect to the air-feeding direction). The current plate 23 directs an air flow generated by the air feeder 11 toward the heater 22. It should be noted that the specific configuration of the warm air generator 12 is not particularly limited. As one configuration example, a known rod-shaped heater 22 and a known current plate 23 may be provided in a known resin casing. In addition, the warm air generator 12 may be configured such that, upstream of the heater 22, the warm air generator 12 becomes wide in the width direction of the seat cushion 31.

In the present embodiment, a straightening member, such as the aforementioned current plate 23, is used in order to spread the air flow fed from the substantially discoid air feeder 11 over the entire heater 22 (i.e., over the entire width of the seat cushion 31). However, the present invention is not thus limited. The installation of the straightening member is not essential if the air flow from the air feeder 11 can be sufficiently spread in the width direction by utilizing the type or shape of the air feeder 11 or the warm air generator 12.

The blow-out unit 13 is positioned forward of the warm air generator 12, and is a member for blowing out the warm air from the warm air generator 12, such that the warm air is blown out forward of the seat cushion 31. In the present embodiment, the blow-out unit 13 is configured as an "air passage member", such that the interior of the blow-out unit 13 serves as a warm air passage, through which the warm air flows, and the blow-out opening 13a configured to blow out the warm air is provided at the front end of the blow-out unit 13.

In the present embodiment, as shown in FIG. 3, the blow-out unit 13 has a flat shape and is integrally connected to the warm air generator 12, which also has a flat shape. As schematically shown in FIG. 2, the blow-out unit 13 has a thickness less than that of the warm air generator 12. The blow-out opening 13a is provided at the front end of the blow-out unit 13. As shown in FIG. 2, the front end is disposed at a position that is above the height position (see a dashed line L in FIG. 2) of the suction opening 11a of the air feeder 11 and that is at the front of the seat cushion 31.

As shown in FIG. 3, the blow-out opening 13a is formed such that, when the vehicle seat 30 is seen from above, the blow-out opening 13a is curved substantially in an arc-like manner. That is, portions of the blow-out opening 13a, the portions corresponding to both ends of the vehicle seat 30, are positioned more rearward as becoming closer to both the ends of the vehicle seat 30.

The blow-out opening 13a is provided facing diagonally downward at the front of the seat cushion 31. In the present embodiment, the blow-out opening 13a is configured as a slit-shaped opening, which is wide in the width direction. It should be noted that the shape of the blow-out opening 13a is not limited to a slit shape. As an alternative example, the shape of the blow-out opening 13a may be such that a large number of small openings are arranged in a line side by side in the width direction, or such that two or three slit-shaped openings are arranged side by side in the width direction.

A blow-out unit front surface 13b serves as a front shield. Therefore, for the purpose of decorating the front of the seat cushion 31 (or the front of the vehicle seat 30), the blow-out unit front surface 13b is formed as a glossy smooth surface, or various decorative shapes are formed on the blow-out unit front surface 13b.

As shown in FIG. 4, the width of the in-vehicle heating device 10 is less than the distance between a pair of slide rails 37 of the slide device 33. By setting the width of the in-vehicle heating device 10 to be less than the distance between the slide rails 37, the air feeder 11 and the warm air generator 12 of the in-vehicle heating device 10 can be housed in the reverse side of the seat cushion 31. Even if, as shown in FIG. 1, the operating lever 34 is substantially U-shaped, having a width substantially the same as the distance between the slide rails 37, and is disposed at the front of the seat cushion 31, the blow-out unit 13 can be housed between the slide rails 37.

In a case where the operating lever 34 is substantially U-shaped as shown in FIG. 1, the operating area of the operating lever 34 is positioned at the front of the seat cushion 31. In this case, the installation position of the in-vehicle heating device 10 overlaps the operating path of the operating lever 34, and there is a risk that the operation of the operating lever 34 may be hindered due to the presence of the in-vehicle heating device 10. In this respect, in the present embodiment, as shown in FIG. 2 and FIG. 3, the blow-out unit 13 is positioned on, or on the extension of, the operating path of the operating lever 34, and the blow-out unit 13 is thinner than the warm air generator 12. Owing to such a configuration of the blow-out unit 13, a possibility that the substantially U-shaped operating lever 34 comes into contact with the blow-out unit 13 when the operating lever 34 is operated can be sufficiently reduced. As a result, a wide operating area for the operating lever 34 is obtained, and thereby reduction in the usability of the slide device 33 can be avoided.

It should be noted that the specific configuration of the blow-out unit 13 is not particularly limited. The blow-out unit 13 is only required to be made of a known resin and configured such that the interior of the blow-out unit 13 serves as a warm air passage, and such that the blow-out unit 13 includes the above-described blow-out opening 13a and the blow-out unit front surface 13b, which doubles as a front shield. Of the blow-out unit 13, at least the blow-out unit front surface 13b may be formed of a material that particularly tends to radiate heat (e.g., a known resin material), which will be described below.

When the dimensions of the in-vehicle heating device 10 according to the present embodiment in the width direction are seen as dimensional changes that are made from the air feeder 11 toward the blow-out unit 13, as shown in FIG. 3, the dimension of the warm air generator 12 in the width direction suddenly and greatly increases, relative to the air feeder 11, to the dimension at the installation position of the heater 22, and the dimension of the blow-out unit 13 in the width direction slightly increases from the dimension of the warm air generator 12 at the installation position of the heater 22, eventually reaching the dimension of the wide blow-out opening 13a. Accordingly, an air stream from the air feeder 11 flows downstream toward the blow-out opening 13a in a spreading manner. Therefore, warm air discharged from the blow-out opening 13a spreads in a fan-like manner, and is thereby sent to the entire foot space of the user.

It should be noted that, as an alternative example, the dimension of the warm air generator 12 in the width direction may suddenly and greatly increase, relative to the air feeder 11, to the dimension at the installation position of the heater 22 in a manner similar to the above, and the dimension of the blow-out unit 13 in the width direction may also suddenly and greatly increase relative to the warm air generator 12, eventually reaching the dimension of the wider blow-out opening 13a.

[Example of Operation of In-Vehicle Heating Device]

Next, one example of operation performed by the in-vehicle heating device 10 according to Embodiment 1, the operation being performed for warming up the feet of the user, is specifically described with reference to FIG. 1 to FIG. 4 and FIG. 5.

Figure 5:
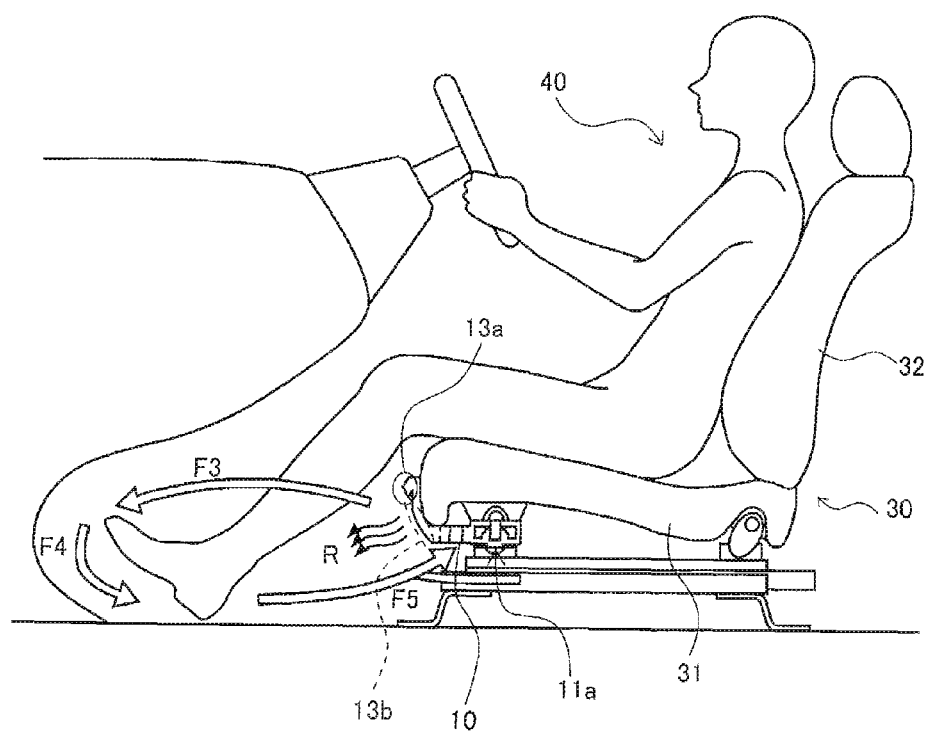
FIG. 5 is a schematic diagram showing one example of a state where the in-vehicle heating device shown in FIG. 1 warms up the feet of a user.

FIG. 5 is a schematic diagram showing one example of a state where the in-vehicle heating device shown in FIG. 1 warms up the feet of the user.

First, an operating unit or the like (not shown) of a vehicle such as an automobile is operated to start the operation of the in-vehicle heating device 10. In response, the fan motor 21 of the air feeder 11 rotates, and thereby an air flow is formed. The air flow thus formed flows from the air feeder 11 toward the warm air generator 12 as indicated by block arrows F1 in FIG. 3. The current plate 23 causes the air flow from the air feeder 11 to spread in the width direction of the warm air generator 12. As shown in FIG. 3, the warm air generator 12 includes the rod-shaped heater 22, which crosses (perpendicularly in FIG. 3) the air flow and extends in the width direction. The air flow is heated by the heater 22 to become warm air. The warm air flows from the warm air generator 12 toward the blow-out unit 13 as indicated by block arrows F2 in FIG. 3.

As previously described, as shown in FIG. 2, the blow-out unit 13 is provided with the blow-out opening 13a configured to blow out the warm air. The blow-out opening 13a is provided at a position that is above the suction opening 11a of the air feeder 11 and that is at the front of the seat cushion 31. The blow-out opening 13a is a slit-shaped opening, which is wide in the width direction. Therefore, as indicated by block arrows F3 in FIG. 3, the blow-out unit 13 can blow out the warm air forward from the position above the suction opening 11a in a manner to spread the warm air in the width direction of the seat cushion 31.

Accordingly, as shown in FIG. 5, the warm air (indicated by a block arrow F3) blown out forward from the upper blow-out opening 13a is blown toward the vicinity of the calves of a user 40. Then, the warm air changes its direction from forward to rearward around the toes of the user 40 while descending as indicated by a block arrow F4 in FIG. 5. Thereafter, as indicated by a block arrow F5, the warm air flows from below toward the air feeder 11, which is positioned diagonally upward. In this manner, a reflux flow that flows downward from above the feet of the user 40 is formed around the feet of the user 40. This makes it possible to suitably send the warm air over the entire feet of the user 40 seated on the seat cushion 31 while effectively avoiding the occurrence of temperature unevenness.

Moreover, since the blow-out unit 13 is an air passage member whose thickness is less than that of the warm air generator 12 as previously described, the warm air from the warm air generator 12 (indicated by block arrows F2) passes through a narrow air passage, and is then blown out of the blow-out opening 13a (as indicated by block arrows F3). This makes it possible to add impetus to the warm air, thereby blowing out the warm air at a high air velocity. Accordingly, the flow of the warm air indicated by the block arrow F3 in FIG. 5 can be favorably directed toward the lower front, which allows the reflux flow to be formed more easily. Thus, by forming the blow-out unit 13 to be thinner than the warm air generator 12, the aforementioned reduction in the usability of the operating lever 34 can be avoided, and also, the reflux flow is easily formed around the feet of the user 40.

The warm air that returns to the air feeder 11 from the toes of the user 40 owing to the formation of the reflux flow is sucked into the air feeder 11 through the suction opening 11a positioned at the bottom of the air feeder 11. In this manner, the air flow that has warmed up the feet of the user 40 is sucked into the air feeder 11. The sucked air is heated again by the warm air generator 12, and then blown out of the blow-out unit 13. This makes efficient heating possible.

In addition, the blow-out unit front surface 13b not only doubles as the front shield as previously described, but is capable of emitting radiation heat as indicated by arrows R in FIG. 5 by being heated by the warm air since the blow-out unit front surface 13b is formed of a heat-radiating material. Accordingly, a part of the blow-out unit 13, the part doubling as the front shield (i.e., the blow-out unit front surface 13b), serves as a heat-radiating surface. Therefore, at the front of the seat cushion 31, both heating by the warm air and heating by the radiation heat from the heat-radiating surface can be utilized. Consequently, heating efficiency can be further improved.

Even if the blow-out unit front surface 13b is not a heat-radiating surface, the occurrence of heat loss can be suppressed since the blow-out unit 13 doubles as the front shield. Specifically, for example, the vehicle-use seat disclosed in Patent Literature 1 is configured such that the air discharge duct from the air feeder is connected to the front shield, and the discharge opening is formed in the front shield. Since the heat supply unit is provided in the air discharge duct, thermal energy from the heat supply unit dissipates via the air discharge duct before reaching the front shield (the front of the seat cushion). This causes heat loss and results in lowered heating efficiency.

On the other hand, in the present embodiment, since the blow-out unit front surface 13b serves as the front shield, it is not necessary that a blow-out duct extending from the air feeder 11 to connect to the front of the seat cushion 31 be provided as a separate member from the front shield. Accordingly, release of thermal energy from such a duct to areas other than the front of the seat cushion 31 can be avoided. Therefore, even if the blow-out unit front surface 13b is not a heat-radiating surface, the occurrence of heat loss from a duct during the heating can be suppressed, and thereby heating efficiency can be improved.

Since the blow-out unit front surface 13b doubles as the front shield, at the time of installing the in-vehicle heating device 10 on the vehicle seat 30, processes such as a process of forming an opening in the front shield and a process of connecting a duct to the front shield are not necessary. This makes it possible to prevent the manufacturing process from becoming complex and cumbersome. In addition, since the blow-out unit 13 can be used as the front shield, an increase in the number of components can be suppressed.

It should be noted that, in Embodiment 1, it will suffice if at least a part of the blow-out unit 13 is positioned at the front of the seat cushion 31 and doubles as the front shield. Therefore, a part of the blow-out unit 13, the part doubling as the front shield, is not limited to the blow-out unit front surface 13b of Embodiment 1. The example in FIG. 5, which illustrates the reflux flow, shows a case where the in-vehicle heating device 10 is provided on the driver's seat of a vehicle, such as an automobile. However, the present embodiment is not thus limited. Of course, as an alternative, the in-vehicle heating device 10 may be provided on the lower part of the front side of the seat cushion 31 of, for example, the front passenger seat or a rear seat.

In Embodiment 1, as shown in FIG. 3, when the vehicle seat 30 is seen from above, the blow-out opening 13a is formed to be substantially arc-shaped such that its portion corresponding to the center of the vehicle seat 30 protrudes to be a forefront portion. However, as an alternative, the blow-out opening 13a may be formed to be substantially arc-shaped such that its central portion has a straight shape, and both of its end portions are positioned more rearward as becoming closer to both ends of the vehicle seat 30.

Further, the blow-out unit 13 may be provided with a guide for causing the warm air discharged from the blow-out opening 13a to radially spread in the width direction. By forming such a guide, the warm air blown out of the blow-out opening 13a can be caused to spread more widely in the width direction. As a result, the warm air spreads in a fan-like manner, and thereby the warm air is sent to the entire foot space of the user.

Embodiment 2

An in-vehicle heating device according to Embodiment 2 is configured such that, in the in-vehicle heating device according to Embodiment 1, a blow-out opening configured to blow out the warm air is provided at a front of the warm air generator, and is positioned above the suction opening. The blow-out unit is plate-shaped and extends from an upper edge of the blow-out opening to reach a position at the front of the seat cushion, the blow-out unit being configured as a warm air guide plate guiding the warm air from the blow-out opening along a front surface of the warm air guide plate to the front of the seat cushion. The warm air guide plate doubles as the front shield.

In the in-vehicle heating device according to Embodiment 2, the air feeder and the warm air generator may be positioned at a reverse side of the seat cushion. A distal end of the warm air guide plate may be curved diagonally downward at the front of the seat cushion.

Alternatively, the in-vehicle heating device according to Embodiment 2 is configured such that, in the in-vehicle heating device according to Embodiment 1, a blow-out opening configured to blow out the warm air is provided at a front of the warm air generator, and is positioned above the suction opening. The blow-out unit is plate-shaped and extends from an upper edge of the blow-out opening to reach a position at the front of the seat cushion, the blow-out unit being configured as a warm air guide plate guiding the warm air from the blow-out opening along a front surface of the warm air guide plate to the front of the seat cushion.

In the in-vehicle heating device according to Embodiment 2, a distal end of the warm air guide plate may be curved diagonally downward at the front of the seat cushion.

It should be noted that, other than the above-described features, the in-vehicle heating device according to Embodiment 2 may be configured in the same manner as the in-vehicle heating device according to Embodiment 1.

[Configuration Example of In-Vehicle Heating Device]

Figure 6:
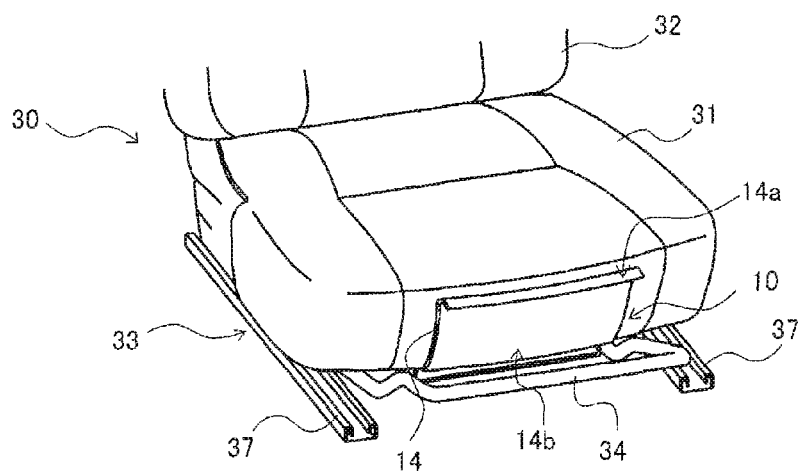
FIG. 6 is a perspective view schematically showing one example of a state where an in-vehicle heating device according to Embodiment 2 is installed on a vehicle seat.
Figure 7:
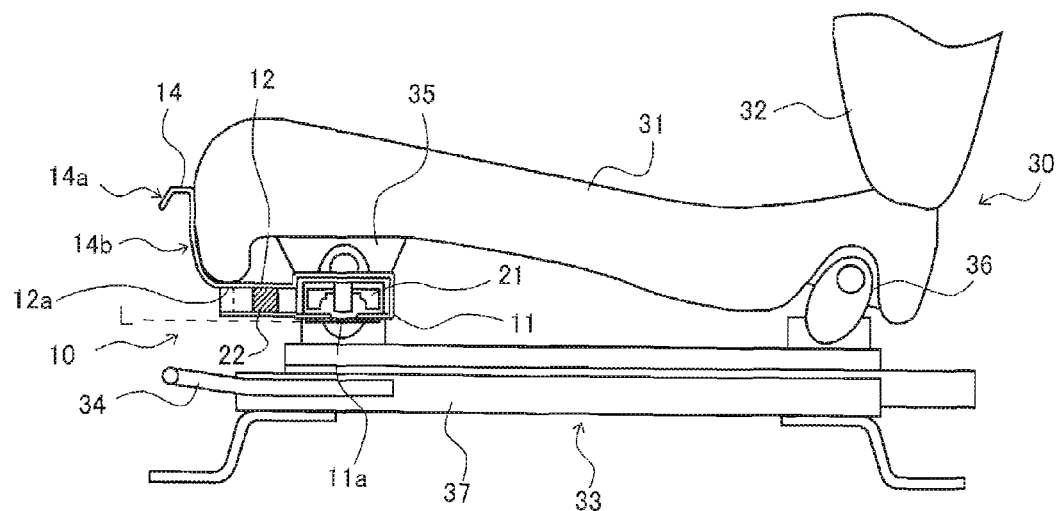
FIG. 7 is a schematic diagram showing a side view of the in-vehicle heating device of FIG. 6 and showing one example of the internal configuration of the in-vehicle heating device.

FIG. 6 is a perspective view schematically showing one example of a state where the in-vehicle heating device according to Embodiment 2 is installed on a vehicle seat. FIG. 7 is a schematic diagram showing a side view of the in-vehicle heating device of FIG. 6 and also showing one example of the internal configuration of the in-vehicle heating device.

In the in-vehicle heating device 10 according to Embodiment 1, the blow-out unit 13 is configured as the air passage member, the interior of which serves as the warm air passage. Embodiment 2 is different from Embodiment 1 in that the blow-out unit 13 according to Embodiment 2 is configured as a plate-shaped member, which guides the warm air.

Specifically, as shown in FIG. 6 and FIG. 7, the fundamental configuration of the in-vehicle heating device 10 according to Embodiment 2 is the same as that of the in-vehicle heating device 10 according to Embodiment 1. However, in the in-vehicle heating device 10 according to Embodiment 2, a blow-out opening 12a configured to blow out the warm air is provided at the front of the warm air generator 12 and is positioned above the suction opening 11a, and a blow-out unit 14 is configured as a plate-shaped member, which extends from the upper edge of the blow-out opening 12a to reach a position at the front of the seat cushion 31.

Similar to the blow-out opening 13a according to Embodiment 1, the blow-out opening 12a is slit-shaped and wide in the width direction of the seat cushion 31. The blow-out opening 12a is positioned below the seat cushion 31. The warm air that is blown out of the blow-out opening 12a is guided along the front surface of the blow-out unit 14, which is a plate-shaped member, while spreading in the width direction, to the front of the seat cushion 31. Therefore, the blow-out unit 14 can be regarded as a "warm air guide plate". The distal end of the blow-out unit 14 is curved diagonally downward at the front of the seat cushion 31. Hereinafter, the distal end is referred to as a "guide plate front edge 14a" for the sake of convenience of the description. Similar to the blow-out unit 13 of Embodiment 1, the front surface of the blow-out unit 14 doubles as the front shield. The front surface of the blow-out unit 14 is also referred to as a "guide plate front surface 14b" for the sake of convenience of the description.

When the vehicle seat 30 is seen from above, the guide plate front edge 14a is formed to be curved substantially in an arc-like manner such that its portions corresponding to both ends of the vehicle seat 30 are positioned more rearward as becoming closer to both the ends of the vehicle seat 30. The guide plate front edge 14a may be formed to be curved substantially in an arc-like manner such that its central portion has a straight shape, and both of its end portions are positioned more rearward as becoming closer to both the ends of the vehicle seat 30.

It should be noted that the specific configuration of the air feeder 11 is the same as that described in Embodiment 1. The air feeder 11 includes the fan motor 21, and the suction opening 11a is formed in the bottom surface of the air feeder 11 (see FIG. 3). The specific configuration of the warm air generator 12 is also the same as that described in Embodiment 1, except that the warm air generator 12 is connected to the blow-out unit 14 at the blow-out opening 12a. The warm air generator 12 includes the rod-shaped heater 22 and the current plate 23 (see FIG. 3).

[Example of Operation of In-Vehicle Heating Device]

Next, one example of operation performed by the in-vehicle heating device 10 according to Embodiment 2, the operation being performed for warming up the feet of the user, is specifically described with reference to FIG. 6, FIG. 7, and FIG. 8.

Figure 8:
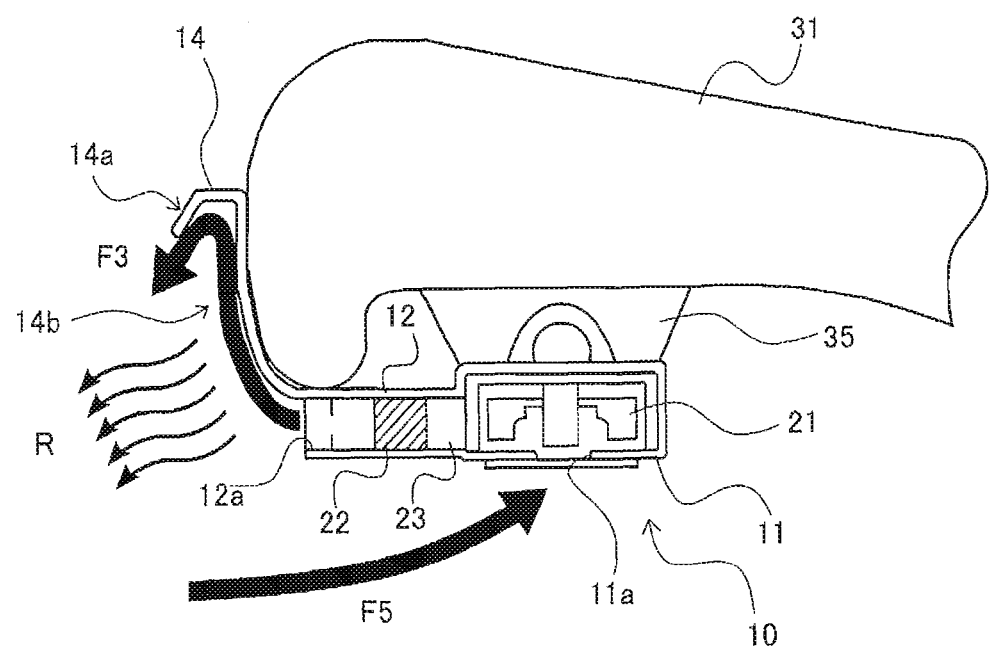
FIG. 8 is a schematic diagram showing one example of a state where the in-vehicle heating device shown in FIG. 6 blows out warm air and sucks in external air.

FIG. 8 is a schematic diagram showing one example of a state where the in-vehicle heating device shown in FIG. 6 blows out warm air and sucks in external air.

When the in-vehicle heating device 10 according to Embodiment 2 operates, basically similar to the in-vehicle heating device 10 according to Embodiment 1, the current plate 23 causes the air flow from the air feeder 11 to spread in the width direction of the warm air generator 12. The air flow is heated by the heater 22 to become warm air. The warm air flows toward the blow-out unit 14 (see FIG. 8). As shown in FIG. 7, the blow-out unit 14 is plate-shaped and extends from the upper edge of the blow-out opening 12a to reach a position at the front of the seat cushion 31. The guide plate front edge 14a, which is the distal end of the blow-out unit 14, is curved diagonally downward at the front of the seat cushion 31. Therefore, as indicated by a block arrow F3 in FIG. 8, the warm air blown out of the blow-out opening 12a is guided along the front surface of the blow-out unit 14 (the guide plate front surface 14b) to the front of the seat cushion 31, and is then blown toward the vicinity of the calves of the user 40.

In this manner, the blow-out unit 14 can blow out the warm air forward from the position above the suction opening 11a, such that the warm air spreads in the width direction of the seat cushion 31, and the reflux flow described in Embodiment 1 is formed around the feet of the user 40. This consequently makes it possible to suitably send the warm air over the entire feet of the user 40 seated on the seat cushion 31 while effectively avoiding the occurrence of temperature unevenness.

Since the blow-out unit 14 is a plate-shaped member (serving as a warm air guide plate), the thickness thereof is less than the thickness of the warm air generator 12. Therefore, similar to the blow-out unit 13 of Embodiment 1, a possibility that the operating lever 34 comes into contact with the blow-out unit 14 when the operating lever 34 is operated is reduced. As a result, a wide operating area for the operating lever 34 is obtained, and thereby reduction in the usability of the slide device 33 can be avoided.

As indicated by a block arrow F5 in FIG. 8, the warm air that returns to the air feeder 11 from the toes of the user 40 owing to the formation of the reflux flow is sucked into the air feeder 11 through the suction opening 11a positioned at the bottom of the air feeder 11. In this manner, similar to Embodiment 1, the air flow that has warmed up the feet of the user 40 is sucked into the air feeder 11. The sucked air is heated again by the warm air generator 12, and then blown out of the blow-out unit 14. This makes efficient heating possible.

When the vehicle seat 30 is seen from above, the guide plate front edge 14a is formed to be substantially arc-shaped such that its portions corresponding to both ends of the vehicle seat 30 are positioned more rearward as becoming closer to both the ends of the vehicle seat 30. Accordingly, the warm air blown out of the guide plate front edge 14a radially spreads in the width direction in a fan-like manner, and is thereby sent to the entire foot space of the user.

In addition, if the guide plate front surface 14b is formed of a heat-radiating material similar to Embodiment 1, then as indicated by arrows R in FIG. 8, the guide plate front surface 14b can emit radiation heat by being heated by the warm air. Accordingly, at the front of the seat cushion 31, both heating by the warm air and heating by the radiation heat from the heat-radiating surface can be utilized. Consequently, heating efficiency can be further improved.

Since it is not necessary that a duct be provided separately from the front shield, even if the guide plate front surface 14b is not a heat-radiating surface, the occurrence of heat loss from such a duct during the heating can be suppressed, and thereby heating efficiency can be improved. Similar to Embodiment 1, if the guide plate front surface 14b doubles as the front shield, the manufacturing process can be prevented from becoming complex and cumbersome, and an increase in the number of components can be suppressed.

Embodiment 3

An in-vehicle heating device according to Embodiment 3 is configured such that, in the in-vehicle heating device according to Embodiment 1 or 2, the air feeder, the warm air generator, and the blow-out unit are vertically integrated together, and are provided at the front of the seat cushion. A front surface of the integrated air feeder, warm air generator, and blow-out unit doubles as the front shield. It should be noted that, other than the above-described features, the in-vehicle heating device according to Embodiment 3 may be configured in the same manner as the in-vehicle heating device according to Embodiment 1 or 2.

[Configuration Example of In-Vehicle Heating Device]

Figure 9:
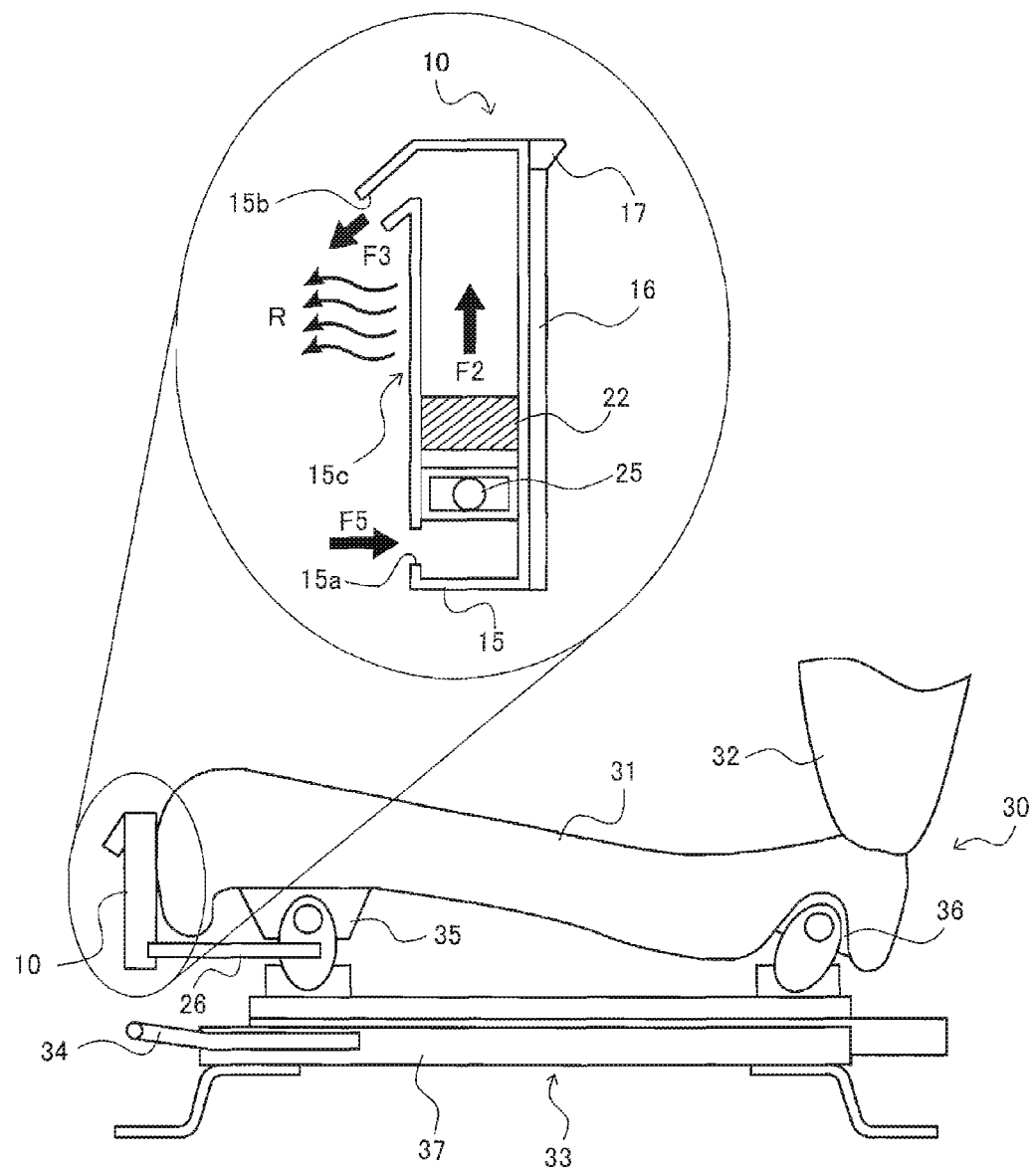
FIG. 9 is a schematic diagram showing, as a side view, one example of a state where an in-vehicle heating device according to Embodiment 3 is installed on a vehicle seat, and also showing one example of the internal configuration of the in-vehicle heating device.

FIG. 9 is a schematic diagram showing, as a side view, one example of a state where the in-vehicle heating device according to Embodiment 3 is installed on a vehicle seat, and also showing one example of the internal configuration of the in-vehicle heating device.

The in-vehicle heating device 10 according to Embodiment 1 and the in-vehicle heating device 10 according to Embodiment 2 are both configured such that the air feeder 11 and the warm air generator 12 are positioned at the reverse side of the seat cushion 31. However, according to Embodiment 3, the air feeder 11, the warm air generator 12, and the blow-out unit 13 are integrated together and arranged at the front of the seat cushion 31.

Specifically, as shown in FIG. 9, in the in-vehicle heating device 10 according to Embodiment 3, the air feeder 11 and the warm air generator 12 of Embodiment 1 or 2 and the blow-out unit 13 or the blow-out unit 14 are vertically integrated together by an integrated casing 15, which is fitted to the front of the seat cushion 31. A casing front wall 15c, which is the front surface of the integrated casing 15, doubles as the front shield.

The in-vehicle heating device 10 has such a flat shape as to cover the front of the seat cushion 31. The lower part of the front surface of the in-vehicle heating device 10 is provided with a slit-shaped suction opening 15a, which is wide in the width direction. The upper part of the front surface is provided with a slit-shaped blow-out opening 15b, which is wide in the width direction. Similar to the blow-out opening 13a according to Embodiment 1, the blow-out opening 15b is provided facing diagonally downward. A cylindrical fan 25, such as a sirocco fan, is provided at a lower position between the suction opening 15a and the blow-out opening 15b. The above-described rod-shaped heater 22 is provided above the cylindrical fan 25. Accordingly, in the in-vehicle heating device 10, the cylindrical fan 25 and its vicinity serve as the air feeder, and the heater 22 and its vicinity serve as the warm air generator. A part of the in-vehicle heating device 10, the part being positioned above the heater 22 and extending to reach the blow-out opening 15b, serves as the blow-out unit.

It should be noted that, similar to Embodiment 1 or 2, a straightening member may be provided between the cylindrical fan 25 and the heater 22. Instead of the cylindrical fan 25, the fan motor 21 may be used, and the current plate 23 may be provided similar to Embodiment 1 or 2 to cause the air flow to spread in the width direction. In the present embodiment, the in-vehicle heating device 10 is installed on the front of the seat cushion 31 by being fitted to the front bracket 35 via a fixing member 26. However, the present invention is not thus limited. The in-vehicle heating device 10 may be installed on the front of the seat cushion 31 by a different known technique.

As described above, the casing front wall 15c, which is the front surface of the integrated casing 15, doubles as the front shield and is a heat-radiating surface similar to Embodiment 1 or 2. The back surface of the integrated casing 15 is provided with a back surface heat insulating material 16. In addition, a pushing portion 17 is provided behind the top surface of the integrated casing 15 (i.e., on the top of the back surface heat insulating material 16). Since the back surface heat insulating material 16 is thus provided, thermal energy is not easily radiated toward the back surface side of the integrated casing 15 (i.e., toward the seat cushion 31 side). This makes it possible to avoid reduction in thermal efficiency, and contributes to maintaining a certain amount of heat radiation from the front surface (the casing front wall 15c).

At the time of installing the in-vehicle heating device 10 on the seat cushion 31, the pushing portion 17 pushes the front surface of the seat cushion 31 over the width direction. Accordingly, no gap is formed between the pushing portion 17 and the front surface of the seat cushion 31. In this manner, the seat cushion 31 and the in-vehicle heating device 10 are integrated together, which improves the external appearance and also prevents foreign matter from entering a gap. Accordingly, the burden of cleaning is eliminated.

[Example of Operation of In-Vehicle Heating Device]

Next, one example of operation performed by the in-vehicle heating device 10 according to Embodiment 3, the operation being performed for warming up the feet of the user, is specifically described with reference to FIG. 9.

Described below is a case where the in-vehicle heating device 10 according to the present embodiment operates. When the in-vehicle heating device 10 operates, owing to the rotation of the cylindrical fan 25, external air is introduced through the lower suction opening 15a (see a block arrow F5 in FIG. 9), and thereby an air flow is formed. The air flow is heated by the heater 22 to become warm air. The warm air flows toward the upper blow-out opening 15b (see a block arrow F2 in FIG. 9), and is blown out of the blow-out opening 15b diagonally downward.

In this manner, the warm air can be blown forward out of the blow-out opening 15b, which is positioned above the suction opening 15a, such that the warm air spreads in the width direction of the seat cushion 31, and the reflux flow described in Embodiment 1 is formed around the feet of the user 40. This consequently makes it possible to suitably send the warm air over the entire feet of the user 40 seated on the seat cushion 31 while effectively avoiding the occurrence of temperature unevenness.

The warm air that returns to the air feeder 11 from the toes of the user 40 (see the block arrow F5 in FIG. 9) owing to the formation of the reflux flow is sucked in through the suction opening 15a formed in the lower part of the integrated casing 15. In this manner, similar to Embodiment 1, the air flow that has warmed up the feet of the user 40 is sucked in, then heated again by the heater 22, and thereafter blown out of the blow-out opening 15b. This makes efficient heating possible.

In addition, if the casing front wall 15c is formed of a heat-radiating material similar to Embodiment 1, then as indicated by arrows R in FIG. 9, the casing front wall 15c can emit radiation heat by being heated by the warm air. In particular, if the back surface heat insulating material 16 is provided in the above-described manner, the heating by the warm air is easily transmitted forward. Accordingly, at the front of the seat cushion 31, both heating by the warm air and heating by the radiation heat from the heat-radiating surface can be utilized. Consequently, heating efficiency can be further improved.

In the present embodiment, since the front shield is integrated with the body (the integrated casing 15) of the in-vehicle heating device 10, it is not necessary that a duct be provided separately from the front shield. Accordingly, even if the casing front wall 15c is not a heat-radiating surface, the occurrence of heat loss from such a duct during the heating can be suppressed, and thereby heating efficiency can be improved. In the present embodiment, not only the front shield but also the air feeder, the warm air generator, and the blow-out unit are all integrated together. Therefore, the configuration of the heating device is simplified, and an increase in the number of components can be suppressed.

Embodiment 4

An in-vehicle heating device according to Embodiment 4 is configured such that any one of the in-vehicle heating devices according to Embodiments 1 to 3 includes a suction guide member configured to guide a suction direction of external air, such that the external air is guided to the suction opening.

It should be noted that, other than the above-described feature, the in-vehicle heating device according to Embodiment 4 may be configured in the same manner as any one of the in-vehicle heating devices according to Embodiments 1 to 3.

Figure 10:
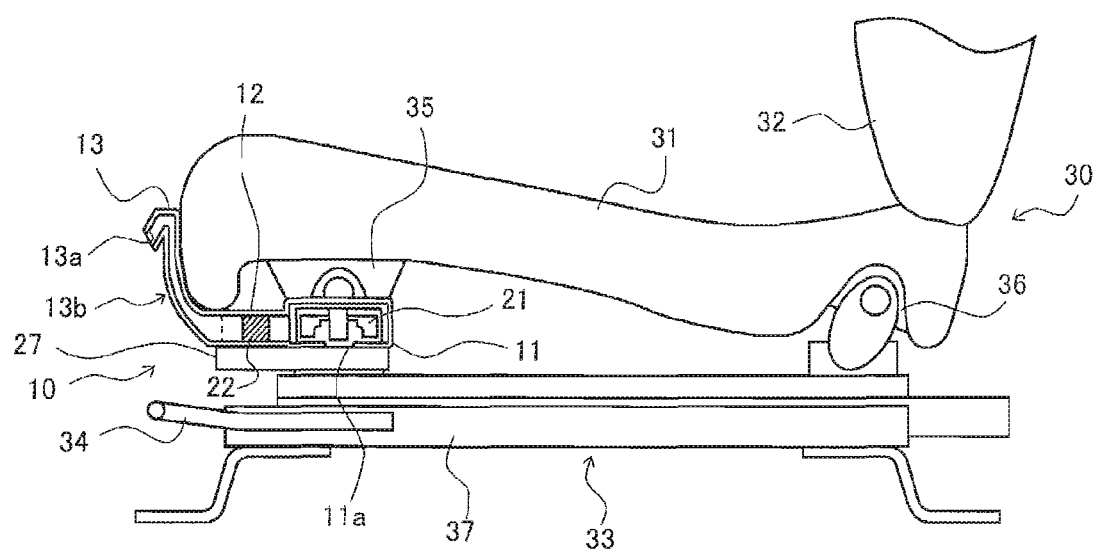
FIG. 10 is a schematic diagram showing, as a side view, a state where an in-vehicle heating device according to Embodiment 4 is installed on a vehicle seat, and also showing one example of the internal configuration of the in-vehicle heating device.
Figure 11:
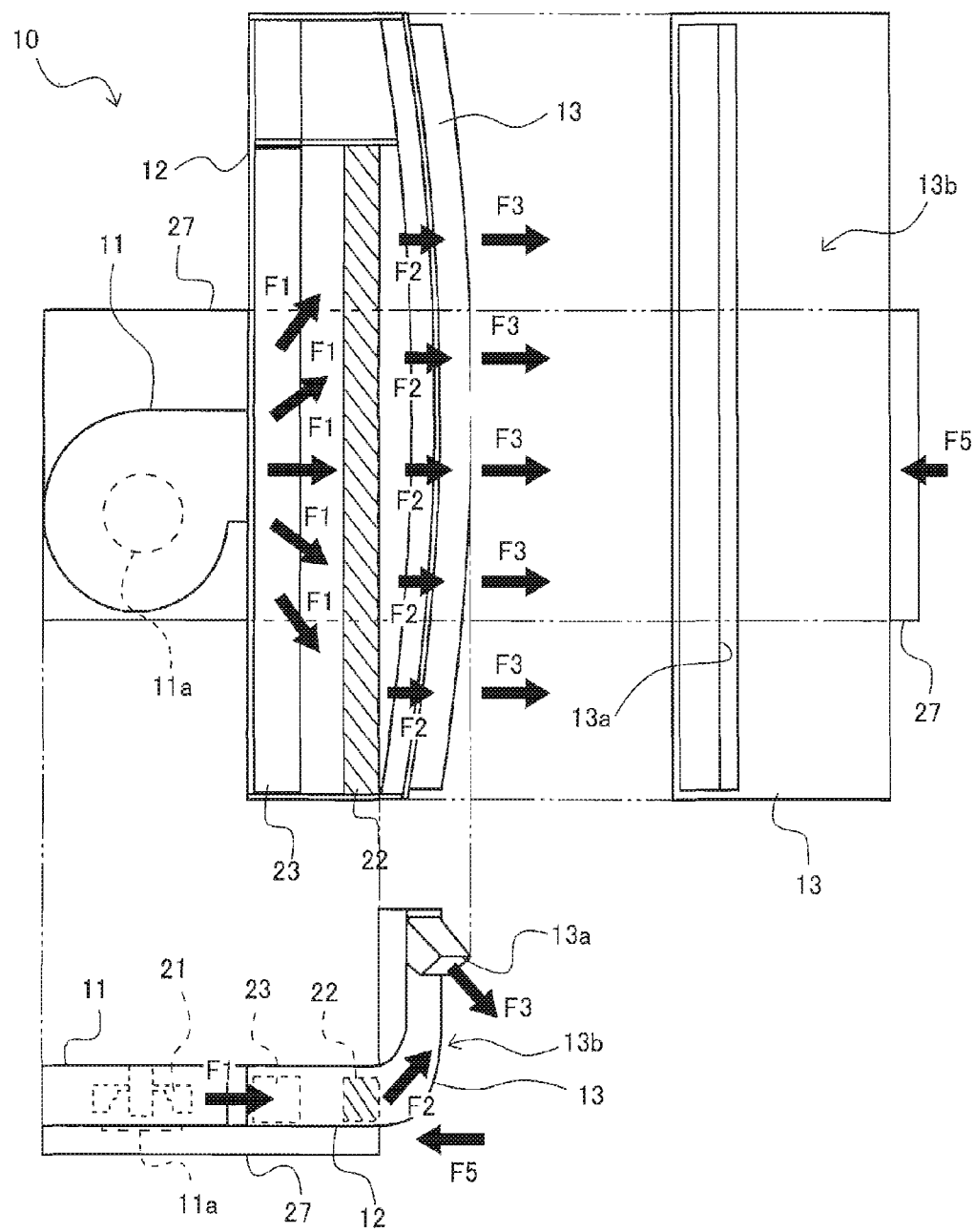
FIG. 11 illustrates a plan view, a side view, and a front view showing one example of the configuration of the in-vehicle heating device of FIG. 10.

FIG. 10 is a schematic diagram showing, as a side view, a state where the in-vehicle heating device according to Embodiment 4 is installed on a vehicle seat, and also showing one example of the internal configuration of the in-vehicle heating device. FIG. 11 illustrates a plan view, a side view, and a front view showing one example of the configuration of the in-vehicle heating device of FIG. 10.

The fundamental configuration of the in-vehicle heating device 10 according to Embodiment 4 is the same as that of the in-vehicle heating device 10 according to Embodiment 1. However, the in-vehicle heating device 10 according to Embodiment 4 is different from the in-vehicle heating device 10 according to Embodiment 1 in that the in-vehicle heating device 10 according to Embodiment 4 includes, as shown in FIG. 10 and FIG. 11, a suction guide member 27 configured to guide the suction direction of external air, such that the external air is guided to the suction opening 11a.

Specifically, the suction guide member 27 according to the present embodiment is positioned below the air feeder 11 and the warm air generator 12 of the in-vehicle heating device 10. The suction guide member 27 is a duct member with a rectangular cross section, and only the front surface thereof has an opening. The suction guide member 27 is provided in such a manner as to connect between the front of the in-vehicle heating device 10 (i.e., the front of the seat cushion 31) and the suction opening 11a formed in the bottom of the air feeder 11. This configuration allows the in-vehicle heating device 10 to readily suck in an air flow indicated by a block arrow F5 in FIG. 11 (i.e., returned warm air) from the front side of the seat cushion 31 through the suction opening 11a. This makes it possible to improve heating efficiency.

Although the suction guide member 27 is not an essential component in the present invention, the suction guide member 27 may be suitably provided in the in-vehicle heating device 10 in accordance with, for example, the shape or installation conditions of the vehicle seat 30. The specific shape of the suction guide member 27 is not limited to the duct shape shown in FIG. 10 and FIG. 11, but may be a wider duct shape. The suction guide member 27 may have an opening not only in the front surface but also in a side surface. In addition, any other configuration known in the field of air flow introduction may be adopted by the suction guide member 27.

Embodiment 5

An in-vehicle heating device according to Embodiment 5 is configured such that, in any one of the in-vehicle heating devices according to Embodiments 1 to 4, a blow-out opening configured to blow out the warm air is provided at a front of the warm air generator and is positioned above the suction opening, such that the warm air generator doubles as the blow-out unit. A suction guide member, which is configured to introduce external air from a position forward of the seat cushion into the suction opening, is provided below the air feeder. It should be noted that, other than the above-described features, the in-vehicle heating device according to Embodiment 5 may be configured in the same manner as any one of the in-vehicle heating devices according to Embodiments 1 to 4.

Figure 12:
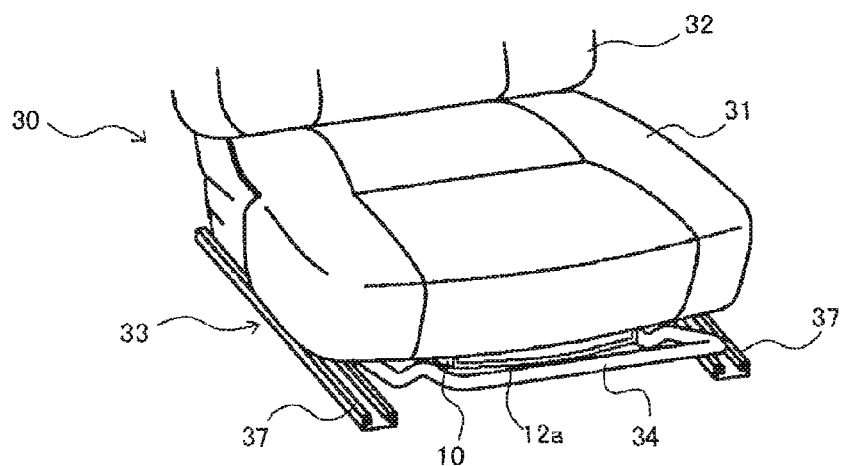
FIG. 12 is a perspective view schematically showing one example of a state where an in-vehicle heating device according to Embodiment 5 is installed on a vehicle seat.
Figure 13:
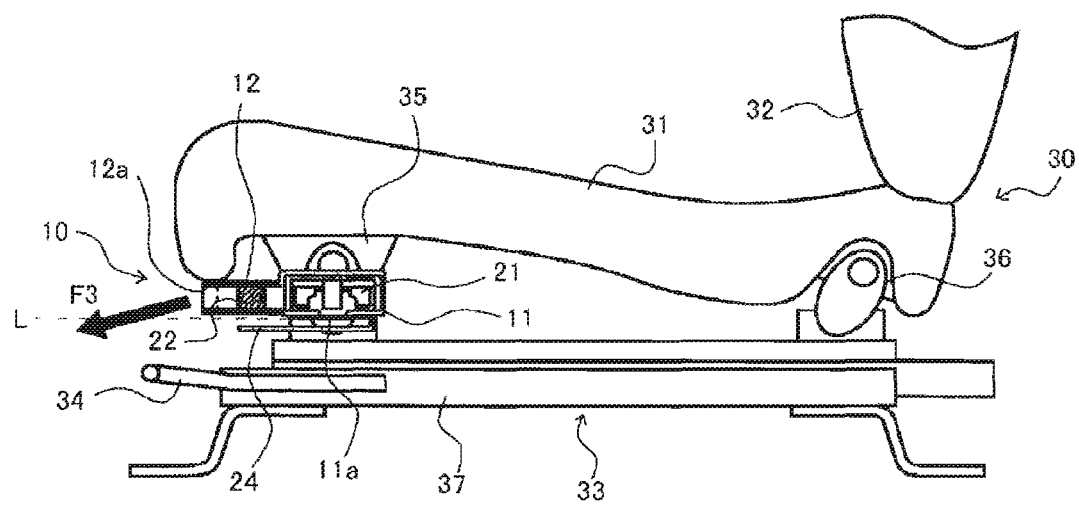
FIG. 13 is a schematic diagram showing a side view of the in-vehicle heating device of FIG. 12, and also showing one example of the internal configuration of the in-vehicle heating device.

FIG. 12 is a perspective view schematically showing one example of a state where the in-vehicle heating device according to Embodiment 5 is installed on a vehicle seat. FIG. 13 is a schematic diagram showing a side view of the in-vehicle heating device of FIG. 12, and also showing one example of the internal configuration of the in-vehicle heating device.

The in-vehicle heating device 10 according to Embodiment 1 includes the blow-out unit 13 as an air passage member, and the in-vehicle heating device 10 according to Embodiment 2 includes the blow-out unit 14 as a plate-shaped member (a warm air guide plate). In Embodiment 5, the blow-out opening 12a is provided at the front of the warm air generator 12 and is positioned above the suction opening 11a, such that the warm air generator 12 doubles as the blow-out unit.

Specifically, as shown in FIG. 12 and FIG. 13, the fundamental configuration of the in-vehicle heating device 10 according to Embodiment 5 is the same as that of the in-vehicle heating device 10 according to Embodiment 1 or that of the in-vehicle heating device 10 according to Embodiment 2. However, the configuration of the in-vehicle heating device 10 according to Embodiment 5 does not substantially include the blow-out unit 13 of Embodiment 1 or the blow-out unit 14 of Embodiment 2.

In the present invention, as previously described, it is preferred to include the blow-out unit 13 or the blow-out unit 14, each of which is positioned forward of the warm air generator 12 and configured to blow out warm air forward from a position above the suction opening 11a such that the warm air spreads in the width direction of the seat cushion 31. However, the blow-out unit 13 or the blow-out unit 14 can be eliminated as shown in FIG. 13 if the blow-out opening 12a (see also FIG. 7 and FIG. 8) of the warm air generator 12 can blow out the warm air forward from a position above the suction opening 11a such that the warm air spreads in the width direction of the seat cushion 31. In such a case, it can be considered that the warm air generator 12 doubles as the blow-out unit.

When the vehicle seat 30 is seen from above, the blow-out opening 12a of the warm air generator 12 is formed to be substantially arc-shaped such that its portions corresponding to both ends of the vehicle seat 30 are positioned rearward.

The blow-out opening 12a may be formed to be curved substantially in an arc-like manner such that its central portion has a straight shape, and both of its end portions are positioned more rearward as becoming closer to both the ends of the vehicle seat 30.

The present embodiment preferably includes a front suction guide member 24 below the air feeder 11 as shown in FIG. 13. The front suction guide member 24 is a member for introducing external air into the suction opening 11a from a position forward of the seat cushion 31. In the configuration shown in FIG. 13, the front suction guide member 24 is configured as a plate-shaped member covering the lower side and the rear side of the suction opening 11a. The front suction guide member 24 is not an essential component. However, if the front suction guide member 24 is installed, external air is introduced into the suction opening 11a from the front side and the lateral side. Therefore, while the above-described reflux flow is being formed around the feet of the user 40, warm air that returns from the front side (indicated by the block arrow F5 in FIG. 5 or FIG. 8) can be readily introduced into the suction opening 11a. This makes it possible to improve heating efficiency.

In particular, in the present embodiment, components substantially corresponding to the blow-out unit 13 or the blow-out unit 14 are eliminated. Accordingly, although the warm air from the blow-out opening 12a can be spread in the width direction of the seat cushion 31, the substantial blow-out position of the warm air (the warm air blow-out position indicated by the block arrow F3 in FIG. 5 or FIG. 8) in the present embodiment is lower than in Embodiment 1 or 2. For this reason, the reflux flow indicated by the block arrows F3, F4, and F5 in FIG. 5 may be less easily formed compared to Embodiment 1 or 2. However, if the front suction guide member 24 is installed, the air flow indicated by the block arrow F5 (i.e., the flow of returned warm air) is easily formed, which consequently makes it possible to form the reflux flow favorably.

When the vehicle seat 30 is seen from above, the blow-out opening 12a is formed to be substantially arc-shaped such that its portions corresponding to both ends of the vehicle seat 30 are positioned more rearward as becoming closer to both the ends of the vehicle seat 30. Accordingly, the warm air blown out of the blow-out opening 12a radially spreads in the width direction in a fan-like manner, and is thereby sent to the entire foot space of the user.

Embodiment 6

An in-vehicle heating device according to Embodiment 6 is configured such that, in any one of the in-vehicle heating devices according to Embodiments 1 to 5, a front end of the blow-out unit is disposed at a position rearward of a front-side end of the seat cushion.

In the in-vehicle heating device according to Embodiment 6, the blow-out unit may be configured such that a front surface of the blow-out unit emits radiation heat by being heated by the warm air.

Alternatively, the in-vehicle heating device according to Embodiment 6 is provided on a lower part of a seat cushion serving as a seating unit of a vehicle seat, and includes: an air feeder including a suction opening through which external air is sucked into the air feeder; a warm air generator including a heater therein, the warm air generator being configured to heat air fed from the air feeder to generate warm air; and a blow-out unit configured to blow out the warm air from the warm air generator, such that the warm air is blown out forward of the seat cushion. A front end of the blow-out unit is disposed at a position rearward of a front-side end of the seat cushion.

In the in-vehicle heating device according to Embodiment 6, a front surface of the blow-out unit may double as a front shield, which serves as a decorative member.

It should be noted that, other than the above-described features, the in-vehicle heating device according to Embodiment 6 may be configured in the same manner as any one of the in-vehicle heating devices according to Embodiments 1 to 5.

[Configuration Example of In-Vehicle Heating Device]

Figure 14:
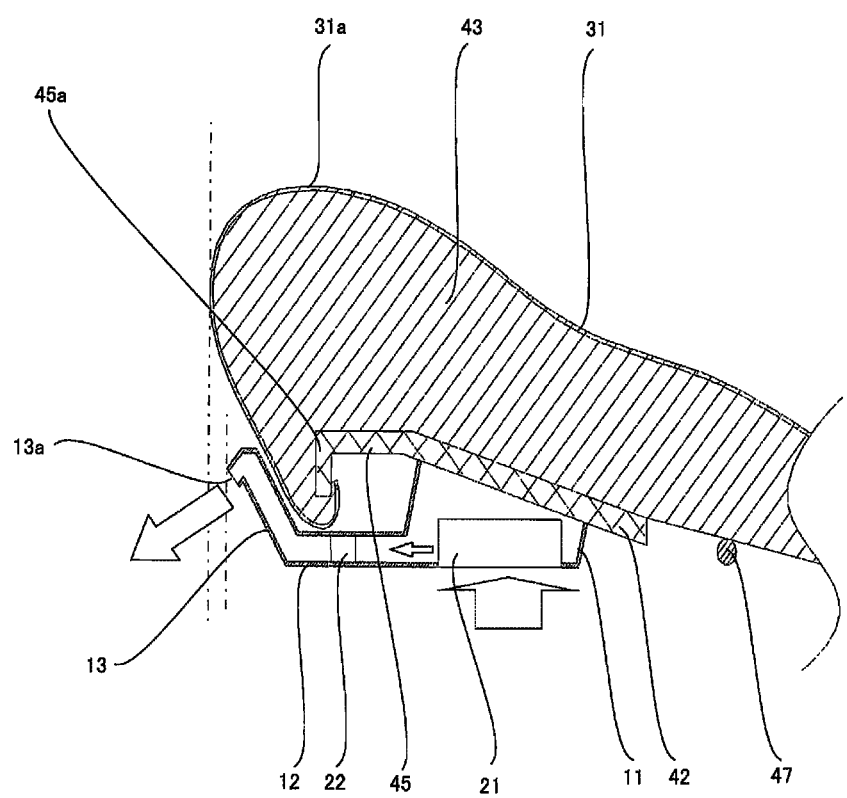
FIG. 14 is a sectional view schematically showing one example of a state where an in-vehicle heating device according to Embodiment 6 is installed on a vehicle seat.
Figure 15:
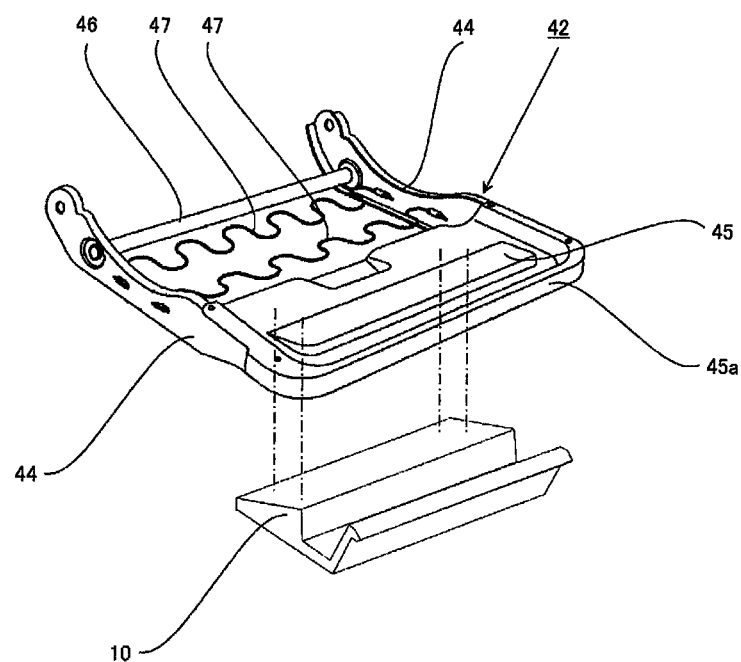
FIG. 15 is a perspective view schematically showing a state where the in-vehicle heating device shown in FIG. 14 is separated from the frame of the vehicle seat.
Figure 16:
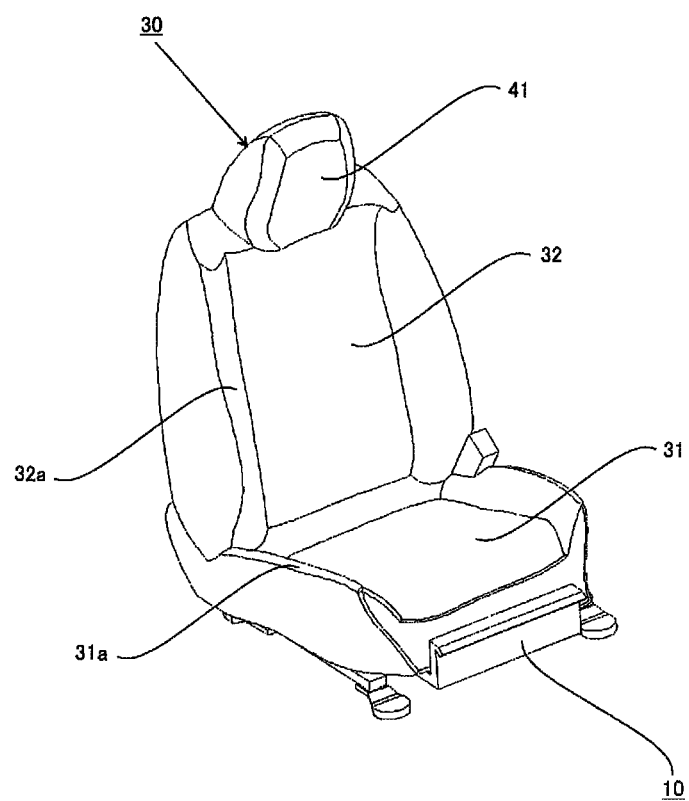
FIG. 16 is a perspective view showing the vehicle seat on which the in-vehicle heating device shown in FIG. 14 is installed.

FIG. 14 is a sectional view schematically showing one example of a state where the in-vehicle heating device according to Embodiment 6 is installed on a vehicle seat. FIG. 15 is a perspective view schematically showing a state where the in-vehicle heating device shown in FIG. 14 is separated from the frame of the vehicle seat. FIG. 16 is a perspective view showing the vehicle seat on which the in-vehicle heating device shown in FIG. 14 is installed.

As shown in FIG. 16, the vehicle seat 30 is constituted by the seat back 32, the seat cushion 31, and a head rest 41. The seat back 32 and the seat cushion 31 are formed in the following manner: cushion pads (not shown) are mounted on respective seat frames, which are then covered by seat cover materials 32a and 31a, respectively.

The seat frame of the vehicle seat 30 is constituted by a seat back frame (not shown) serving as a part of the seat back 32 and a seating frame 42 serving as a part of the seat cushion 31.

The seat back 32 is formed in the following manner a cushion pad (not shown) is mounted on the seat back frame; and then the cushion pad mounted on the seat back frame is covered by the seat cover material 32a. The seat back 32 supports the user's back from behind.

The seat cushion 31 is formed in the following manner: a cushion pad 43 is mounted on the seating frame 42; and then the cushion pad 43 mounted on the seating frame 42 is covered by the seat cover material 31a. The seat cushion 31 supports the user from below. The rear end of the seating frame 42 is connected to the seat back frame via a reclining mechanism (not shown).

As shown in FIG. 15, the seating frame 42 is formed to have a substantially rectangular frame body, and includes: side frames 44, which are spaced apart from each other in the left-right direction; a pan frame 45, which is a plate-shaped frame and which spans between front portions (front ends) of the respective side frames 44; a member pipe 46, which serves as a connecting member and which is disposed between rear portions of the respective side frames 44; and a plurality of springs 47, which serve as elastic members and which span between the side frames 44.

The pan frame 45 is fixedly joined to the front portions of the respective side frames 44. The member pipe 46 is joined to the rear portions of the respective side frames 44 in a manner to span between the rear portions. Thus, the side frames 44 are connected to each other by the pan frame 45 and the member pipe 46.

The pan frame 45 is formed of a metal so as to mainly support the thighs of the user. The upper surface of the pan frame 45 is formed in a substantially flat and substantially rectangular shape. The front end of the pan frame 45 is bent downward, and thereby a front bent portion 45a is formed. An end portion of the seat cover material 31a is locked to the lower end of the front bent portion 45a.

As shown in FIG. 14 and FIG. 15, the in-vehicle heating device 10 is fixed to the lower surface of the pan frame 45 of the seating frame 42 of the vehicle seat 30 via screws or the like, which are not shown.

As shown in FIG. 14 and FIG. 15, the in-vehicle heating device 10 includes, for example, the air feeder 11, the warm air generator 12, and the blow-out unit 13. The air feeder 11 is fixed to the lower surface of the pan frame 45 on the front side of the seat cushion 31 via screws or the like. The fan motor 21 is provided inside the air feeder 11. The air feeder 11 is provided with a suction opening (a bell mouth) (not shown) for sucking in external air. The suction opening is provided facing downward. The shape of the air feeder 11 in the present embodiment is substantially discoid in accordance with the shape of the fan motor 21, which is housed inside the air feeder 11. The air feeder 11 partly protrudes and connects to the warm air generator 12 so as to be in communication with the warm air generator 12. It should be noted that the specific configuration of the air feeder 11 is not particularly limited. As one configuration example, a known fan motor 21 may be provided in a known resin casing, and a suction opening in a known shape may be formed in the casing.

In the present embodiment, the suction opening may be formed in the bottom surface of the air feeder 11. However, the position of the suction opening is not thus limited. As an alternative, the suction opening may be formed, for example, in a side surface or front surface of the air feeder 11, so long as the suction opening faces downward. For example, the suction opening may be formed in a side surface or front surface (in the vicinity of the connection to the warm air generator 12) of the air feeder 11, such that the suction opening faces downward. Forming the suction opening such that the suction opening faces downward makes it possible to assuredly prevent warm air from the blow-out opening 13a from being directly sucked into the suction opening. It should be noted that the suction opening may face not only downward but also forward or laterally, so long as the warm air from the blow-out opening 13a is prevented from being directly sucked into the suction opening.

At the reverse side of the seat cushion 31, the warm air generator 12 is positioned downstream of the air feeder 11. The warm air generator 12 heats air fed from the air feeder 11 to generate warm air. Inside the warm air generator 12, the heater 22, which is wide in the width direction of the seat cushion 31, is provided. Accordingly, the warm air generator 12 has a flat shape that is wide in the width direction of the seat cushion 31. Inside the warm air generator 12, a current plate (not shown) is provided for uniformly feeding the air fed from the air feeder 11 to the blow-out unit 13.

The heater 22 is provided in the warm air generator 12 such that the heater 22 extends in a manner to cross an air-feeding direction from the air feeder 11. In the present embodiment, a PTC ceramic heater is used as the heater 22. PTC ceramic heaters have a risk of becoming damaged when an impact shock or the like is applied thereto. In a case where a PTC ceramic heater is disposed in the blow-out unit 13, there is a risk that the user inadvertently kicks the blow-out unit 13, and thereby the PTC ceramic heater becomes damaged. However, in the present embodiment, since the heater 22 is disposed in the warm air generator 12 positioned below the vehicle seat 30, there is not a risk of being kicked by the user inadvertently. This makes it possible to prevent damage to the heater 22. In the warm air generator 12, the current plate is provided at a position upstream of the heater 22. The current plate directs the air flow generated by the air feeder 11 toward the heater 22.

It should be noted that the specific configuration of the warm air generator 12 is not particularly limited. As one configuration example, a known heater 22 may be provided in a known resin casing. In addition, the warm air generator 12 may be configured such that, upstream of the heater 22, the warm air generator 12 becomes wide in the width direction of the seat cushion 31.

In the present embodiment, a straightening member, such as the aforementioned current plate, is used in order to spread the air flow fed from the substantially discoid air feeder 11 over the entire heater 22 (i.e., over the entire width of the seat cushion 31). However, the present invention is not thus limited. The installation of the straightening member is not essential if the air flow from the air feeder 11 can be sufficiently spread in the width direction by utilizing the type or shape of the air feeder 11 or the warm air generator 12.

The blow-out unit 13 is positioned forward of the warm air generator 12, and is a member for blowing out the warm air from the warm air generator 12, such that the warm air is blown out forward of the seat cushion 31. In the present embodiment, the blow-out unit 13 is configured as an air passage member, such that the interior of the blow-out unit 13 serves as a warm air passage, through which the warm air flows, and the blow-out opening 13a configured to blow out the warm air is provided at the front end of the blow-out unit 13.

In the present embodiment, the blow-out unit 13 has a flat shape and is integrally connected to the warm air generator 12, which also has a flat shape. The blow-out unit 13 is provided with the blow-out opening 13a configured to blow out warm air. The blow-out opening 13a is provided at a position that is above the suction opening of the air feeder 11 and that is at the front of the seat cushion 31. As shown in FIG. 14, the upper end of the blow-out unit 13 is formed to be slightly lower than the pan frame 45, and the front end of the blow-out unit 13 is disposed at a position rearward of the front-side end of the seat cushion 31.

The blow-out opening 13a is open at the front of the seat cushion 31 such that the blow-out opening 13a faces diagonally downward. In the present embodiment, the blow-out opening 13a is configured as a slit-shaped opening, which is wide in the width direction. It should be noted that the shape of the blow-out opening 13a is not limited to a slit shape. As an alternative example, the shape of the blow-out opening 13a may be such that a large number of small openings are arranged in a line side by side in the width direction, or such that two or three slit-shaped openings are arranged side by side in the width direction.

Although the front surface of the blow-out unit 13 is formed as a glossy smooth surface for the purpose of decorating the front of the seat cushion 31, various decorative shapes may be formed on the front surface of the blow-out unit 13.

[Example of Operation of In-Vehicle Heating Device 10]

Described next is one example of operation performed by the in-vehicle heating device 10 for warming up the feet of the user.

An operating unit or the like (not shown) of a vehicle such as an automobile is operated to start the operation of the in-vehicle heating device 10. In response, the fan motor 21 of the air feeder 11 rotates, and thereby an air flow is formed. The air flow thus formed flows from the air feeder 11 toward the warm air generator 12 as indicated by a block arrow in FIG. 14. The current plate causes the air flow from the air feeder 11 to spread in the width direction of the warm air generator 12. Since the warm air generator 12 includes the heater 22, the air flow is heated by the heater 22 to become warm air. The warm air flows from the warm air generator 12 toward the blow-out unit 13.

The blow-out unit 13 is provided with the blow-out opening 13a configured to blow out the warm air. The blow-out opening 13a is provided at a position that is above the suction opening of the air feeder 11 and that is at the front of the seat cushion 31. The blow-out opening 13a is a slit-shaped opening, which is wide in the width direction. Therefore, as indicated by a block arrow in FIG. 14, the blow-out unit 13 can blow out the warm air forward from the position above the suction opening in a manner to spread the warm air in the width direction of the seat cushion 31.

Accordingly, the warm air (indicated by the block arrow) blown out forward from the upper blow-out opening 13a is blown toward the vicinity of the calves of the user. Then, the warm air changes its direction from forward to rearward around the toes of the user while descending. Thereafter, the warm air flows from below toward the air feeder 11, which is positioned diagonally upward. In this manner, a reflux flow that flows downward from above the feet of the user is formed around the feet of the user. This makes it possible to suitably send the warm air over the entire feet of the user seated on the seat cushion 31 while effectively avoiding the occurrence of temperature unevenness.

Since the blow-out unit 13 is an air passage member whose thickness is less than that of the warm air generator 12, the warm air from the warm air generator 12 passes through a narrow air passage, and is then blown out of the blow-out opening 13a. This makes it possible to add impetus to the warm air, thereby blowing out the warm air at a high air velocity. Accordingly, the flow of the warm air blown out of the blow-out opening 13a can be favorably directed toward the lower front, which allows the reflux flow to be formed more easily. By forming the blow-out unit 13 to be thin, a possibility that the blow-out unit 13 becomes obstructive around the user's feet can be reduced.

The warm air that returns to the air feeder 11 from the toes of the user owing to the formation of the reflux flow is sucked into the air feeder 11 through the suction opening positioned at the bottom of the air feeder 11. In this manner, the air flow that has warmed up the feet of the user is sucked into the air feeder 11. The sucked air is heated again by the warm air generator 12, and then blown out of the blow-out unit 13. This makes efficient heating possible.

In addition, the front surface of the blow-out unit 13 not only doubles as the decorative surface of the vehicle seat, but is formed of a heat-radiating material. Therefore, the front surface of the blow-out unit 13 is capable of emitting radiation heat by being heated by the warm air. Accordingly, the front surface of the blow-out unit 13 serves as a heat-radiating surface. Therefore, at the front of the seat cushion 31, both heating by the warm air and heating by the radiation heat from the heat-radiating surface can be utilized. Consequently, heating efficiency can be further improved.

Even if the front surface of the blow-out unit 13 is not a heat-radiating surface, the occurrence of heat loss can be suppressed. Specifically, for example, the vehicle-use seat disclosed in Patent Literature 1 is configured such that the air discharge duct from the air feeder is connected to the front shield, and the discharge opening is formed in the front shield. Since the heat supply unit is provided in the air discharge duct, thermal energy from the heat supply unit dissipates via the air discharge duct before reaching the front shield (the front of the seat cushion). This causes heat loss and results in lowered heating efficiency.

On the other hand, in the present embodiment, since the front surface of the blow-out unit 13 serves as a decorative member (the front shield), it is not necessary that a blow-out duct extending from the air feeder 11 to connect to the front of the seat cushion 31 be provided as a separate member from the front shield. Accordingly, release of thermal energy from such a duct to areas other than the front of the seat cushion 31 can be avoided. Therefore, even if the front surface of the blow-out unit 13 is not a heat-radiating surface, the occurrence of heat loss from a duct during the heating can be suppressed, and thereby heating efficiency can be improved.

Since the front surface of the blow-out unit 13 doubles as the decorative member (the front shield), at the time of installing the in-vehicle heating device 10 on the vehicle seat 30, processes such as a process of forming an opening in the front shield and a process of connecting a duct to the front shield are not necessary. This makes it possible to prevent the manufacturing process from becoming complex and cumbersome. In addition, since the blow-out unit 13 can be used as the front shield, an increase in the number of components can be suppressed.

When the user is seated on the vehicle seat 30, the cushion pad 43 of the seat cushion 31 is deformed due to the weight of the user. The deformed cushion pad 43 pushes the blow-out unit 13. If the blow-out unit 13 is pushed significantly, the blow-out unit 13 may become damaged. In the present embodiment, as shown in FIG. 1, the upper end of the blow-out unit 13 is formed to be slightly lower than the pan frame 45. Therefore, even if a user with a heavy weight is seated and the cushion pad 43 is greatly deformed, the deformation of the cushion pad 43 will not affect the blow-out unit 13, and thus damage to the blow-out unit 13 can be prevented.

The front end of the blow-out opening 13a is disposed at a position rearward of the front-side end of the seat cushion 31, and the blow-out opening 13a is obscured by the seat cushion 31 when seen from above. As a result, objects are less likely to come into contact with the blow-out opening 13a, and thereby damage to the blow-out opening 13a can be prevented.

Embodiment 7

An in-vehicle heating device according to Embodiment 7 is configured such that any one of the in-vehicle heating devices according to Embodiments 1 to 6 includes: a gap formed between the blow-out unit and a front-side end of the seat cushion; and a cover member covering the gap from above.

In the in-vehicle heating device according to Embodiment 7, the cover member may be fixed to both side surfaces of the seat cushion.

In the in-vehicle heating device according to Embodiment 7, decorative members may be arranged on both side surfaces of the seat cushion, and the cover member may be fixed to the decorative members.

In the in-vehicle heating device according to Embodiment 7, a core material made of a resin and/or a metal may be sewed into an edge of the cover member, the edge facing the seat cushion, and the core material may be fixed to both side surfaces of the seat cushion.

In the in-vehicle heating device according to Embodiment 7, the blow-out unit may be configured such that a front surface of the blow-out unit emits radiation heat by being heated by the warm air.

Alternatively, the in-vehicle heating device according to Embodiment 7 is provided on a lower part of a seat cushion serving as a seating unit of a vehicle seat, and includes: an air feeder including a suction opening through which external air is sucked into the air feeder; a warm air generator including a heater therein, the warm air generator being configured to heat air fed from the air feeder to generate warm air; a blow-out unit configured to blow out the warm air from the warm air generator, such that the warm air is blown out forward of the seat cushion; a gap formed between the blow-out unit and a front-side end of the seat cushion; and a cover member covering the gap from above.

In the in-vehicle heating device according to Embodiment 7, an edge of the cover member, the edge facing the seat cushion, may be caused to thrust into the seat cushion.

In the in-vehicle heating device according to Embodiment 7, a surface of the cover member may be decorated in the same manner as decorative members.

In the in-vehicle heating device according to Embodiment 7, decorative members may be arranged on both side surfaces of the seat cushion, and the cover member may be formed by using the same material as a seat cover material of the seat cushion. A core material made of a resin and/or a metal may be sewed into an edge of the cover member, the edge facing the seat cushion, and the core material may be fixed to the decorative members.

In the in-vehicle heating device according to Embodiment 7, a front surface of the blow-out unit may double as a front shield, which serves as a decorative member.

It should be noted that, other than the above-described features, the in-vehicle heating device according to Embodiment 7 may be configured in the same manner as any one of the in-vehicle heating devices according to Embodiments 1 to 6.

[Configuration Example of In-Vehicle Heating Device]

Figure 17:
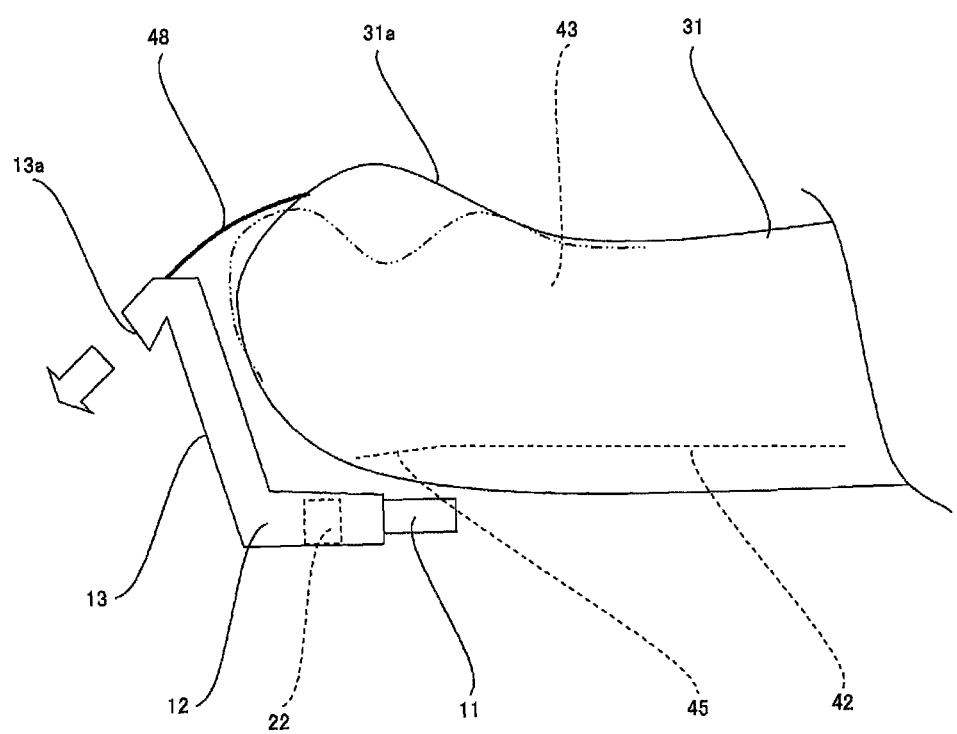
FIG. 17 is a sectional view schematically showing one example of a state where an in-vehicle heating device according to Embodiment 7 is installed on a vehicle seat.
Figure 18:
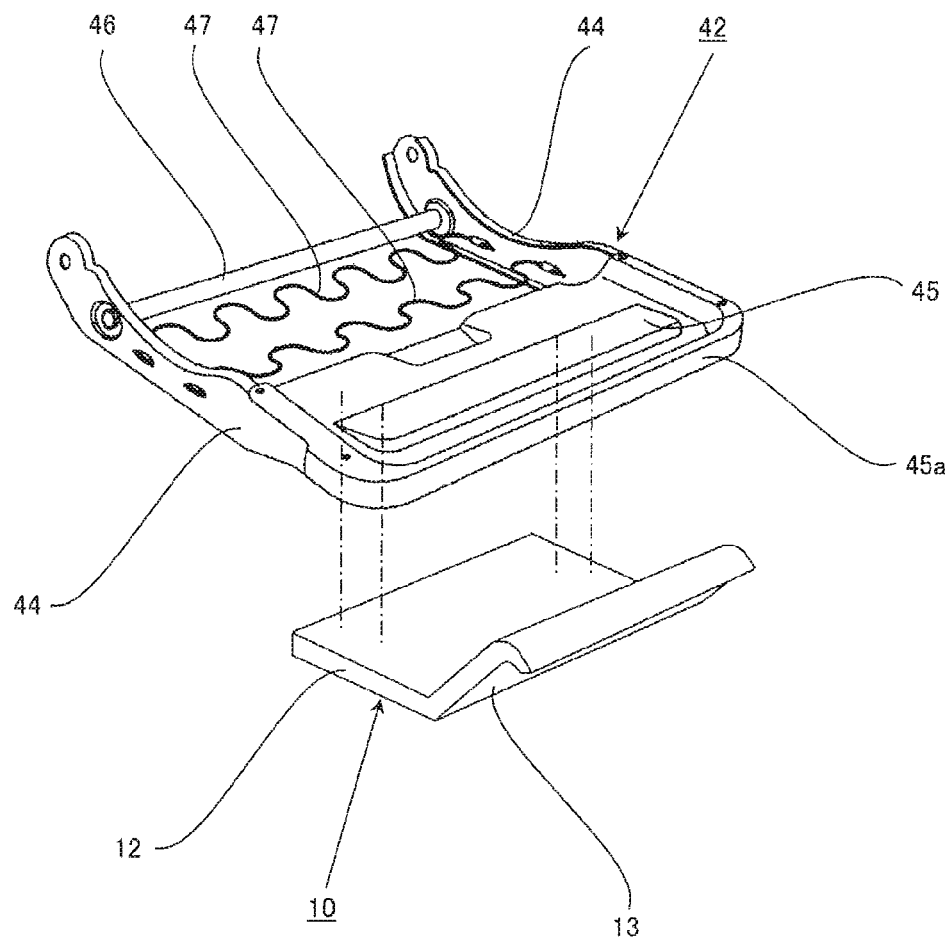
FIG. 18 is a perspective view schematically showing a state where the in-vehicle heating device shown in FIG. 17 is separated from the frame of the vehicle seat.
Figure 19:
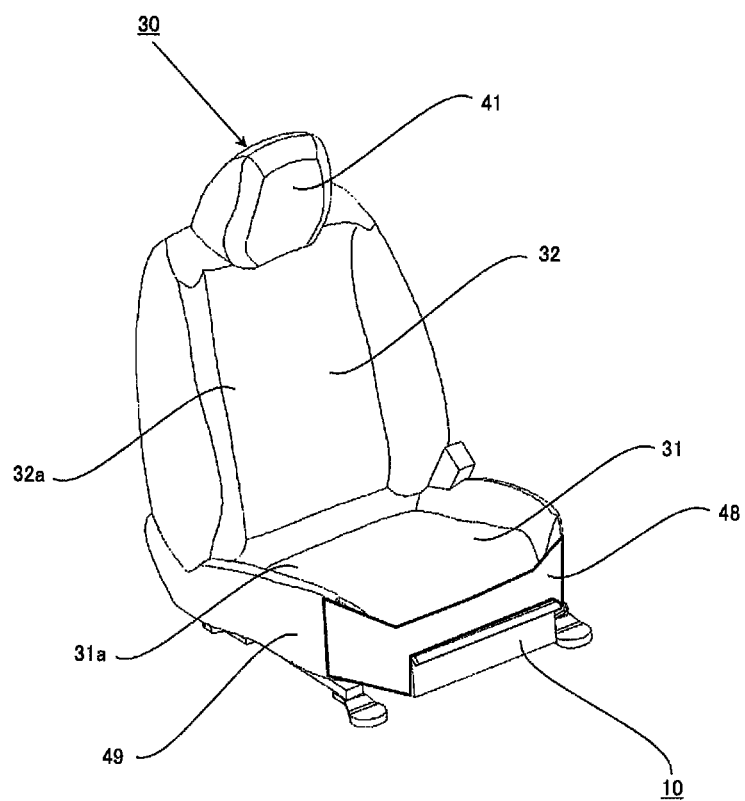
FIG. 19 is a perspective view showing the vehicle seat on which the in-vehicle heating device shown in FIG. 17 is installed.

FIG. 17 is a sectional view schematically showing one example of a state where the in-vehicle heating device according to Embodiment 7 is installed on a vehicle seat. FIG. 18 is a perspective view schematically showing a state where the in-vehicle heating device shown in FIG. 17 is separated from the frame of the vehicle seat. FIG. 19 is a perspective view showing the vehicle seat on which the in-vehicle heating device shown in FIG. 17 is installed.

As shown in FIG. 17 to FIG. 19, the fundamental configuration of the in-vehicle heating device according to Embodiment 7 is the same as that of the in-vehicle heating device according to Embodiment 6. However, the in-vehicle heating device according to Embodiment 7 is different from the in-vehicle heating device according to Embodiment 6, in that the in-vehicle heating device according to Embodiment 7 includes: a gap formed between the blow-out unit 13 and the front-side end of the seat cushion 31; and a cover member 48 covering the gap from above. A specific description is given below.

The blow-out unit 13 is disposed such that the blow-out unit 13 is spaced apart from the front-side end of the seat cushion 31. The dimensions of the space between the blow-out unit 13 and the seat cushion 31 are set to such dimensions that even if the seat cushion 31 is deformed when the user is seated or places his/her knee(s) on the seat cushion 31, the seat cushion 31 will not come into contact with the blow-out unit 13. In FIG. 17, a two-dot chain line indicates a deformed state of the seat cushion 31.

As shown in FIG. 19, the cover member 48 is disposed in such a manner as to cover the space between the blow-out unit 13 and the seat cushion 31. Both ends of the cover member 48 are fixed to respective decorative members 49. The decorative members 49 are made of a synthetic resin and are attached to both side surfaces of the seat cushion 31, respectively.

In the present embodiment, the cover member 48 is formed of a synthetic resin. The cover member 48 is fixed to the decorative members 49 such that, in the present embodiment, an edge of the cover member 48, the edge facing the seat cushion 31, slightly thrusts into the seat cushion 31 by approximately 1 to 5 mm. When the user is seated on the vehicle seat 30, the seat cushion 31 becomes deformed in such a manner as to slide relative to the fixed cover member 48, and no gap will be formed between the cover member 48 and the seat cushion 31.

Since no gap is formed between the cover member 48 and the seat cushion 31, the external appearance between the cover member 48 and the seat cushion 31 is natural, and dusts, foreign matter, etc., can be prevented from entering between the cover member 48 and the seat cushion 31.

The cushion pad 43 is housed in the seat cushion 31. Since the cushion pad 43 is made of a foamed member, the seat cushion 31 is formed with a large dimensional tolerance. In the present embodiment, the cover member 48 is configured to thrust into the seat cushion 31 by approximately 1 to 5 mm so that even when the seat cushion 31 with a large dimensional tolerance is deformed, no gap will be formed between the cover member 48 and the seat cushion 31. That is, the cover member 48 is configured to absorb the dimensional tolerance of the seat cushion 31.

By decorating the cover member 48 in the same manner as the decorative members 49, the external appearance of the cover member 48 can be made natural, and is not spoiled. When the user is seated on the vehicle seat 30, the user may come into contact with the cover member 48. Thus, there is a risk of causing damage to the cover member 48. In order to reduce the risk of such damage to the cover member 48, it is preferable to use a material having viscosity such as PP (polypropylene) or PE (polyethylene) as the cover member 48. Needless to say, such a material as PP or PE is suitable as an exterior member since both PP and PE have favorable formability.

In the above-described embodiment, the cover member 48 is formed of a synthetic resin. However, as an alternative, the cover member 48 may be formed by using the same material as the seat cover material 31a of the seat cushion 31, such as leather. In the case of using the same material as the seat cover material 31a, preferably, a linear or plate-shaped core material made of, for example, a synthetic resin or a metal is sewed into both an edge of the cover member 48, the edge facing the seat cushion 31, and an edge of the cover member 48, the edge facing the blow-out unit 13 of the in-vehicle heating device 10, and the core material sewed in each edge is fixed to the decorative members 49 of both the side surfaces of the seat cushion 31 so that displacement of the cover member 48 will be prevented. With such a structure, even if the seat cushion 31 is deformed when the user is seated on the vehicle seat 30, the formation of a gap between the cover member 48 and the seat cushion 31 can be prevented.

Although in the above embodiment the cover member 48 is fixed to the decorative members 49, the decorative members 49 may be eliminated, and the cover member 48 may be fixed to the seat cushion 31.

[Functional Advantages of In-Vehicle Heating Device]

When the user is seated on the vehicle seat 30, the cushion pad 43 of the seat cushion 31 is deformed due to the weight of the user. The deformed cushion pad 43 pushes the blow-out unit 13. If the blow-out unit 13 is pushed significantly, the blow-out unit 13 may become damaged.

However, in the in-vehicle heating device 10 according to Embodiment 7, the blow-out unit 13 is disposed such that the blow-out unit 13 is spaced apart from the seat cushion 31. The dimensions of the space between the blow-out unit 13 and the seat cushion 31 are set to such dimensions that even if the seat cushion 31 is deformed, for example, when the user is seated on the seat cushion 31, the seat cushion 31 will not come into contact with the blow-out unit 13. Therefore, the blow-out unit 13 will not be damaged due to the deformation of the seat cushion 31.

Since the space between the blow-out unit 13 and the seat cushion 31 is covered by the cover member 48, the external appearance will not be spoiled, and dusts and the like will not enter between the blow-out unit 13 and the seat cushion 31.

In the above-described embodiment, the dimensions of the space between the blow-out unit 13 and the seat cushion 31 are set to such dimensions that even if the seat cushion 31 is deformed, for example, when the user is seated on the seat cushion 31, the seat cushion 31 will not come into contact with the blow-out unit 13. However, the dimensions of the space are not thus limited.

Figure 20:
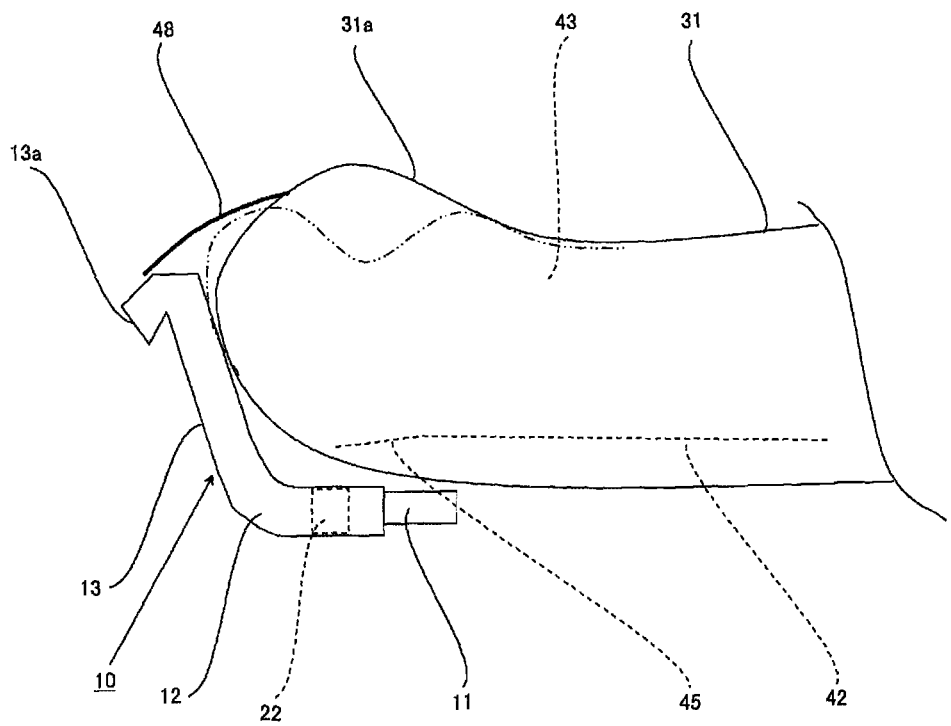
FIG. 20 is a sectional view schematically showing another example of a state where the in-vehicle heating device according to Embodiment 7 is installed on the seat.

FIG. 20 is a sectional view schematically showing another example of a state where the in-vehicle heating device according to Embodiment 7 is installed on the seat. It should be noted that, in FIG. 20, a two-dot chain line indicates a deformed state of the seat cushion.

For example, as shown in FIG. 20, the dimensions of the space between the blow-out unit 13 and the seat cushion 31 may be set to such dimensions that when the seat cushion 31 is deformed, the seat cushion 31 comes into contact with the blow-out unit 13. In this case, a structure in which the deformation of the seat cushion 31 causes the blow-out unit 13 to bend forward may be adopted. It should be noted that in the case of adopting the structure in which the deformation of the seat cushion 31 causes the blow-out unit 13 to bend forward, it is preferable that the connecting portion between the warm air generator 12 and the blow-out unit 13 be formed in an arc-like shape so that the blow-out unit 13 will bend easily.

It should be noted that the present invention is not limited to the embodiments described above, and various modifications can be made within the scope of Claims. Embodiments obtained by suitably combining technical means that are disclosed in different embodiments and variations also fall within the technical scope of the present invention.

INDUSTRIAL APPLICABILITY

The present invention can be widely and suitably used in the field of heating devices to be installed on a vehicle seat of, for example, an automobile.

REFERENCE SIGNS LIST 10 in-vehicle heating device
11 air feeder
11a suction opening
12 warm air generator
12a blow-out opening
13 blow-out unit (air passage member)
13a blow-out opening
13b blow-out unit front surface (front shield)
14 blow-out unit (plate-shaped member, warm air guide plate)
14a guide plate front edge
14b guide plate front surface (front shield)
15 integrated casing
15a suction opening 15b blow-out opening
15c casing front wall (front shield)
16 back surface heat insulating material
21 fan motor
22 heater
23 current plate
25 cylindrical fan
27 suction guide member
30 vehicle seat
31 seat cushion
33 slide device
34 operating lever
37 slide rail
40 user
42 seating frame
43 cushion pad
44 side frame
45 pan frame
45a front bent portion
46 member pipe
47 spring
48 cover member
49 decorative member

The invention claimed is:

1. An in-vehicle heating device provided on a lower part of a front side of a seat cushion serving as a seating unit of a vehicle seat, the in-vehicle heating device comprising:
   an air feeder including a suction opening through which external air is sucked into the air feeder;
   a warm air generator including a heater therein, the warm air generator being configured to heat air fed from the air feeder to generate warm air; and
   a blow-out unit configured to blow out the warm air from the warm air generator, such that the warm air is blown out forward of the seat cushion, wherein
   the in-vehicle heating device is supported on an underside of the seat cushion,
   at least a portion of the blow-out unit comprising a channel for the warm air extends forwardly and upwardly toward the front side of the seat cushion and extends in front of at least a portion of a front surface of the seat cushion, and
   the channel of the blow-out unit doubles as a front shield of the seat cushion, which serves as a decorative member.

2. The in-vehicle heating device according to claim 1, wherein
   the part of the blow-out unit, which is positioned at the front of the seat cushion, is configured to emit radiation heat by being heated by the warm air.

3. The in-vehicle heating device according to claim 1, wherein
   the air feeder and the warm air generator are positioned at a reverse side of the seat cushion,
   an interior of the blow-out unit serves as a warm air passage, through which the warm air from the warm air generator flows,
   a blow-out opening configured to blow out the warm air is provided at a front end of the blow-out unit, and is positioned at the front of the seat cushion, and
   a front surface of the blow-out unit doubles as the front shield.

4. The in-vehicle heating device according to claim 1, wherein
   a blow-out opening configured to blow out the warm air is provided at a front of the warm air generator, and is positioned above the suction opening,
   the blow-out unit is plate-shaped and extends from an upper edge of the blow-out opening to reach a position at the front of the seat cushion, the blow-out unit being configured as a warm air guide plate guiding the warm air from the blow-out opening along a front surface of the warm air guide plate to the front of the seat cushion, and
   the warm air guide plate doubles as the front shield.

5. The in-vehicle heating device according to claim 1, wherein
   the air feeder, the warm air generator, and the blow-out unit are vertically integrated together, and are provided at the front of the seat cushion, and
   a front surface of the integrated air feeder, warm air generator, and blow-out unit doubles as the front shield.

6. The in-vehicle heating device according to claim 1, wherein
   the suction opening is provided facing downward, and
   the blow-out unit is positioned forward of the warm air generator, and is configured to blow out the warm air forward from a position above the suction opening.

7. The in-vehicle heating device according to claim 6, wherein
   the blow-out unit has a flat shape that is wide in a width direction of the seat cushion,
   the blow-out unit has a thickness less than that of the warm air generator, and an interior of the blow-out unit serves as a warm air passage, through which the warm air from the warm air generator flows, and
   a front end of the blow-out unit is disposed at a position that is above the suction opening and that is at the front of the seat cushion, and a blow-out opening configured to blow out the warm air is provided at the front end of the blow-out unit.

8. The in-vehicle heating device according to claim 6, wherein
   a blow-out opening configured to blow out the warm air is provided at a front of the warm air generator, and is positioned above the suction opening, and
   the blow-out unit is plate-shaped and extends from an upper edge of the blow-out opening to reach a position at the front of the seat cushion, the blow-out unit being configured as a warm air guide plate guiding the warm air from the blow-out opening along a front surface of the warm air guide plate to the front of the seat cushion.

9. The in-vehicle heating device according to claim 6, wherein
   the heater is provided in the warm air generator such that the heater extends in a manner to cross an air-feeding direction from the air feeder, and
   in the warm air generator, a straightening member configured to direct a flow of the air from the air feeder toward the heater is provided at a position rearward of the heater.

10. The in-vehicle heating device according to claim 1, wherein
    when the vehicle seat is seen from above, the blow-out opening is formed to be substantially arc-shaped such that its portions corresponding to both ends of the vehicle seat are positioned more rearward as becoming closer to both the ends of the vehicle seat.

11. The in-vehicle heating device according to claim 10, wherein
    the blow-out opening has a width greater than that of the heater provided in the warm air generator.

12. The in-vehicle heating device according to claim 1, comprising:

a gap formed between the blow-out unit and a front-side end of the seat cushion; and a cover member covering the gap from above.

13. The in-vehicle heating device according to claim 12, wherein the cover member is fixed to both side surfaces of the seat cushion.

14. The in-vehicle heating device according to claim 12, wherein decorative members are arranged on both side surfaces of the seat cushion, and the cover member is fixed to the decorative members.

15. The in-vehicle heating device according to claim 12, wherein a core material made of a resin and/or a metal is sewed into an edge of the cover member, the edge facing the seat cushion, and the core material is fixed to both side surfaces of the seat cushion.

16. The in-vehicle heating device according to claim 12, wherein the blow-out unit is configured such that a front surface of the blow-out unit emits radiation heat by being heated by the warm air.

\* \* \* \* \*